United States Patent
Morita et al.

(10) Patent No.: US 8,700,299 B2
(45) Date of Patent: Apr. 15, 2014

(54) NAVIGATION DEVICE, RECOMMENDED SPEED ARITHMETIC DEVICE, AND RECOMMENDED SPEED PRESENTATION DEVICE

(75) Inventors: Shigeki Morita, Tokyo (JP); Takashi Maeda, Tokyo (JP); Hisashi Sugawara, Tokyo (JP); Takatoshi Tosa, Tokyo (JP); Yuji Igarashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/989,078

(22) PCT Filed: Feb. 24, 2011

(86) PCT No.: PCT/JP2011/001067
§ 371 (c)(1),
(2), (4) Date: May 23, 2013

(87) PCT Pub. No.: WO2012/114382
PCT Pub. Date: Aug. 30, 2012

(65) Prior Publication Data
US 2013/0245945 A1    Sep. 19, 2013

(51) Int. Cl.
*G06F 19/00* (2011.01)
(52) U.S. Cl.
USPC ........................... 701/123; 701/490; 701/533
(58) Field of Classification Search
USPC ........................................ 701/123, 490, 533
See application file for complete search history.

(56) References Cited

U.S. PATENT DOCUMENTS

| | | | | |
|---|---|---|---|---|
| 7,632,212 B2* | 12/2009 | Yamanaka et al. | ............ | 477/107 |
| 8,311,722 B2* | 11/2012 | Zhang et al. | ............ | 701/104 |
| 2008/0059035 A1* | 3/2008 | Siddiqui et al. | ............ | 701/93 |
| 2008/0300768 A1* | 12/2008 | Hijikata | ............ | 701/102 |
| 2009/0043467 A1* | 2/2009 | Filev et al. | ............ | 701/57 |
| 2010/0082190 A1* | 4/2010 | Jinno et al. | ............ | 701/22 |
| 2010/0308986 A1* | 12/2010 | Dobryden et al. | ............ | 340/438 |
| 2011/0043348 A1* | 2/2011 | Blackard et al. | ............ | 340/439 |
| 2011/0126797 A1* | 6/2011 | Russell | ............ | 123/294 |
| 2012/0089309 A1* | 4/2012 | Kim et al. | ............ | 701/58 |

FOREIGN PATENT DOCUMENTS

| | | |
|---|---|---|
| JP | 07-125565 A | 5/1995 |
| JP | 11-146464 A | 5/1999 |
| JP | 11-311321 A | 11/1999 |
| JP | 2004-046570 A | 2/2004 |
| JP | 2006-139707 A | 6/2006 |
| JP | 2006-163940 A | 6/2006 |
| JP | 2006-163942 A | 6/2006 |
| JP | 2009-120111 A | 6/2009 |

* cited by examiner

*Primary Examiner* — Hussein A. Elchanti
(74) *Attorney, Agent, or Firm* — Birch, Stewart, Kolasch & Birch, LLP

(57) ABSTRACT

Disclosed is a navigation device including a traveling route estimating unit 1 for estimating a route along which a moving object will travel and which falls within a predetermined region from a current position, a first recommended speed arithmetic unit 10 for computing a recommended speed in each of road sections on the route estimated by the traveling route estimating unit 1 on the basis of road state information showing a road state, and a second recommended speed arithmetic unit 20 for computing a recommended speed in a road section between the road sections for each of which the recommended speed is computed by the first recommended speed arithmetic unit 10 according to a predetermined speed variation function.

18 Claims, 17 Drawing Sheets

FIG.8

(a) Recommended Speed Based On Number Of Lanes And Road Width (Local Street)

| Number Of Lanes (Each Side) | Road Width (Full Width m) | Recommended Speed (km/h) |
|---|---|---|
| 3 Or More | 22 Or More | 60 |
|  | Less Than 22 | 50 |
| 2 | 16 Or More | 60 |
|  | 12 To 16 | 50 |
|  | Less Than 12 | 40 |
| 1 | 8 Or More | 50 |
|  | 6 To 8 | 40 |
|  | Less Than 6 | 30 |
| No Lanes | 5 Or More | 30 |
|  | Less Than 5 | 20 |

(b) Recommended Speed Based On Number Of Lanes And Road Width (Highway)

| Number Of Lanes (Each Side) | Road Width (Width of Each Side m) | Recommended Speed (km/h) |
|---|---|---|
| 3 Or More | (Suburbs) | 100 |
|  | (Urban) | 80 |
| 2 | 12 Or More (Suburbs) | 100 |
|  | 12 Or More (Urban) | 80 |
|  | Less Than 12 | 60 |
| 1 | - | 60 |

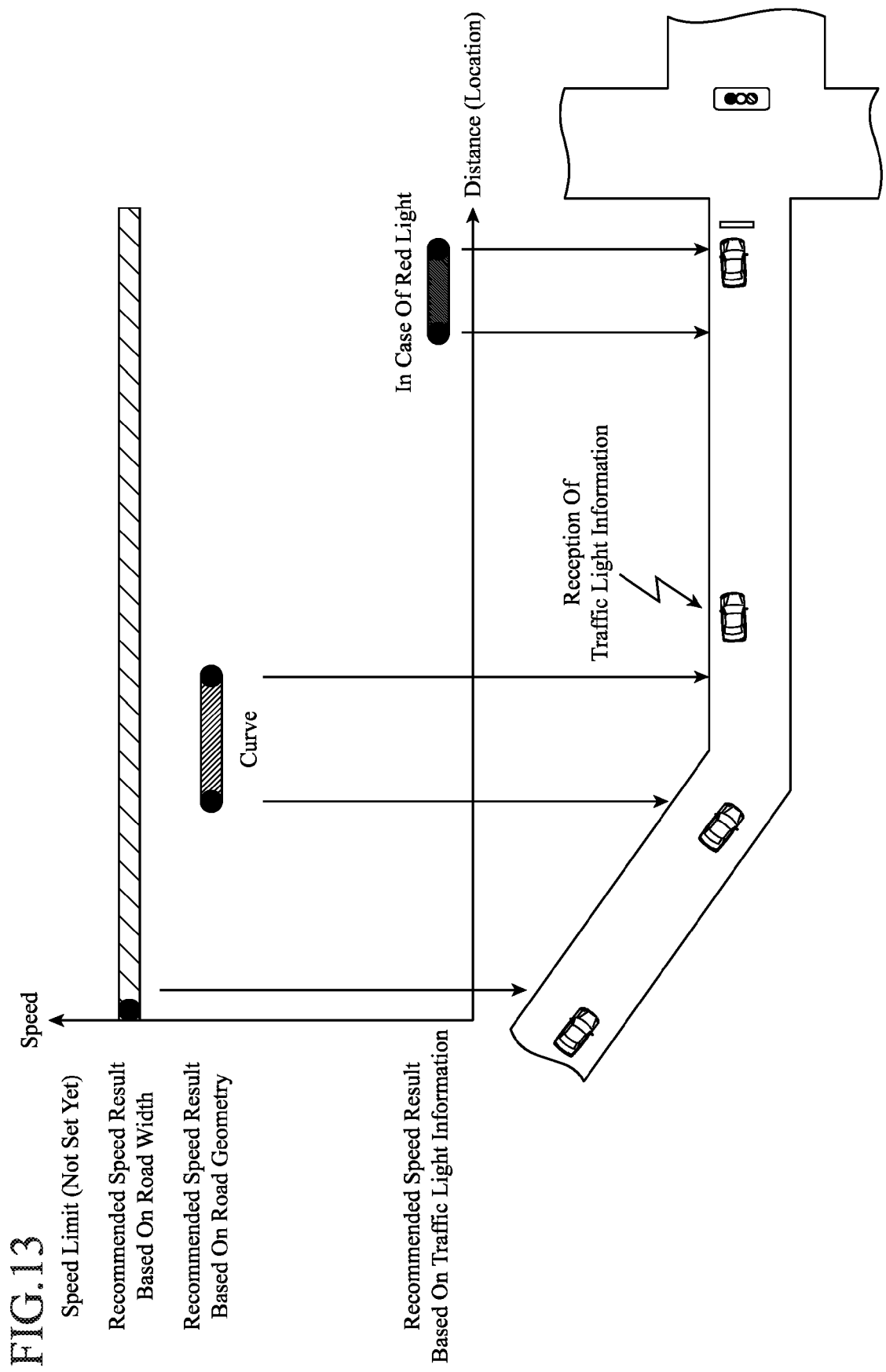

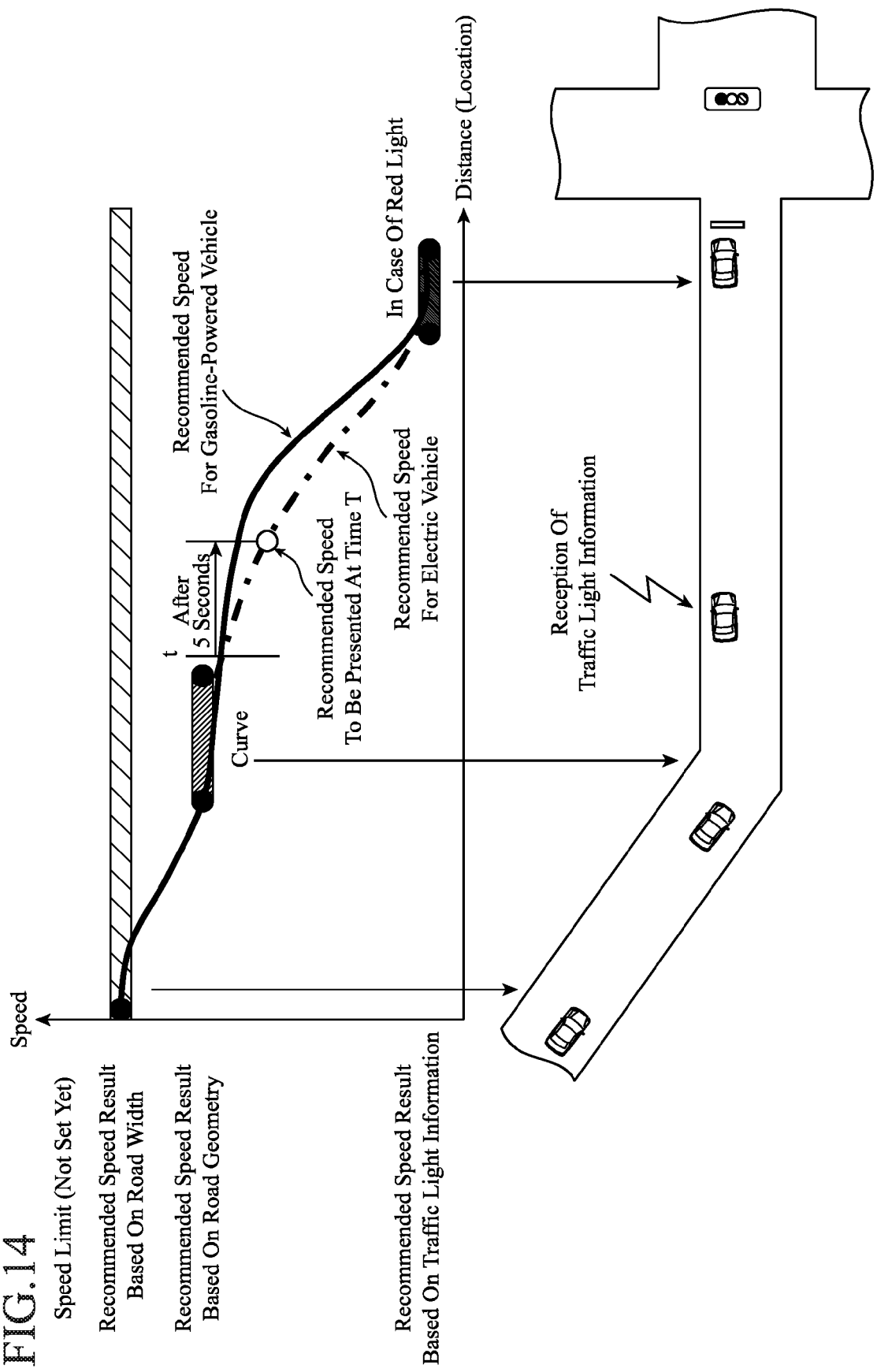

FIG.15

| Parameter Name | | Explanation |
|---|---|---|
| Maximum Acceleration Of Gasoline-Powered Vehicle | 0.1 G | Maximum Acceleration In Case Of Changing Recommended Speed In Direction Of Acceleration |
| Gasoline-Powered Vehicle Fuel Cut Lower Limit Speed | 25 km/h | Lower Limit Speed For Engine Brake For Fuel Cut |
| Regeneration Brake Maximum Deceleration | 0.2 G | Maximum Deceleration Capable Of Recovering Regenerative Power Having Predetermined Value Or Greater |
| ⋮ | ⋮ | ⋮ |

FIG.16

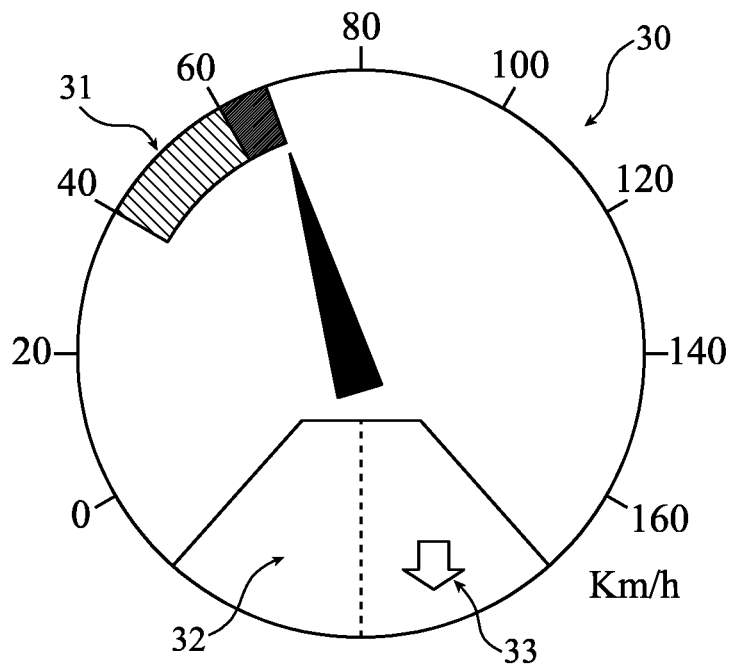

NAVIGATION DEVICE, RECOMMENDED SPEED ARITHMETIC DEVICE, AND RECOMMENDED SPEED PRESENTATION DEVICE

FIELD OF THE INVENTION

The present invention relates to a navigation device, a recommended speed arithmetic device, and a recommended speed presentation device mounted in a moving object, such as a vehicle, for computing a recommended safe speed having a small amount of energy consumption, and for presenting the recommended speed to the user.

BACKGROUND OF THE INVENTION

There is a case in which the driver selects an appropriate traveling speed according to various road environments, but drives his or her vehicle at a speed exceeding a safe speed due to carelessness or the like. For example, patent reference 1 discloses a vehicle-mounted speed excess warning and informing device for calling the driver's attention to an excess in speed limit. This vehicle-mounted speed excess warning and informing device acquires information about the road speed limit on the road along which the vehicle is traveling from a center, and, when the current vehicle speed exceeds the speed limit, displays a warning on the display of the speedometer. Further, patent reference 2 discloses an auto-cruise control device for, when detecting a curve on a route to be traveled while a vehicle is traveling at an auto cruise setting speed, computing the highest vehicle speed that enables the vehicle to pass through the curve properly to reduce the speed of the vehicle to the highest vehicle speed. In addition, a vehicle control device described in patent reference 3 has a unit for recognizing two or more speed limits, and, only when these speed limits match each other, controlling a vehicle in such a way that the vehicle travels at a speed equal to or lower than the speed limits. Further, patent reference 4 discloses a vehicle-mounted device for providing a vehicle approaching a traffic light with information about a proper speed. This vehicle-mounted unit captures information about switching timing for traffic light control, and computes either a maximum traveling speed that enables the vehicle to stop before an intersection or a maximum traveling speed that enables the vehicle to enter an intersection by the time a yellow light ends at the intersection to present the maximum traveling speed to the driver.

RELATED ART DOCUMENT

Patent Reference

Patent reference 1: Japanese Unexamined Patent Application Publication No. 2004-46570
Patent reference 2: Japanese Unexamined Patent Application Publication No. Hei 7-125565
Patent reference 3: Japanese Unexamined Patent Application Publication No. 2009-120111
Patent reference 4: Japanese Unexamined Patent Application Publication No. 2006-139707

SUMMARY OF THE INVENTION

Problems to be Solved by the Invention

Because the road speed limit on a road is set uniformly for a section represented by the road, there is a case in which when a vehicle is traveling along a curve of the road, traveling at a speed lower than the speed limit is more safe than that at the speed limit. Because a conventional technology represented by the vehicle-mounted speed excess warning and informing device disclosed in patent reference 1 is based only on the speed limit on a road, a speed which is recommended from the actual road geometry of the road, such as a curve, cannot be presented. Further, also in a case of combining some of conventional technologies represented by the devices disclosed in patent references 1 to 4, no recommended speed is presented unless the traveling road along which the vehicle is traveling is in a road state satisfying one of conditions because certain road states each of which causes the computation of a recommended speed differ from each other. Therefore, when the driver is driving his or her vehicle, whether or not a recommended speed is presented to the user depends on whether either one of the road states is satisfied. Further, there is a case in which the recommended speed changes suddenly depending on a change in the road state of the traveling road. In this case, the driver has to determine an appropriate speed by himself or herself, and hence such a conventional device is a hard-to-use one which puts the cart before the horse.

The present invention is made in order to solve the above-mentioned problems, and it is therefore an object of the present invention to provide a navigation device, a recommended speed arithmetic device, and a recommended speed presentation device that can present a recommended speed adapted for one of various road states in a traveling route.

Means for Solving the Problem

In accordance with the present invention, there is provided a navigation device having a function of computing a recommended speed of a moving object, the navigation device including: a traveling route estimating unit for estimating a route along which the moving object will travel and which falls within a predetermined region from a current position; a first recommended speed arithmetic unit for computing a recommended speed in each of road sections on the route estimated by the traveling route estimating unit on the basis of road state information showing a road state; a second recommended speed arithmetic unit for computing a recommended speed in a road section between the road sections for each of which the recommended speed is computed by the first recommended speed arithmetic unit according to a predetermined speed variation function; and a parameter setting unit for storing parameters defining operational characteristics of the moving object according to types of moving objects including the moving object, in which the second recommended speed arithmetic unit determines the speed variation function for defining acceleration and deceleration according to the operational characteristics of the moving object by using a parameter which the second recommended speed arithmetic unit selects on a basis of the type of the moving object from among the parameters stored in the parameter setting unit, and computes the recommended speed in the road section between the road sections for which the recommended speed is computed by the first recommended speed arithmetic unit according to the above-mentioned speed variation function.

Advantages of the Invention

In accordance with the present invention, there is provided an advantage of being able to present a recommended speed adapted for one of various road states in the traveling route.

BRIEF DESCRIPTION OF THE FIGURES

FIG. 8 is a diagram showing an example of table data showing a correspondence between recommended speeds and road widths;

FIG. 13 is a diagram explaining a recommended speed at each point according to a change in a road state;

FIG. 14 is a diagram explaining a process of computing a speed which connects between the recommended speeds set for two adjacent points which is carried out by a second recommended speed arithmetic unit;

FIG. 15 is a diagram showing an example of parameters stored in a parameter setting unit;

FIG. 16 is a diagram showing a first display example of recommended speeds and an operation command;

EMBODIMENTS OF THE INVENTION

Hereafter, in order to explain this invention in greater detail, the preferred embodiments of the present invention will be described with reference to the accompanying drawings.

Embodiment 1

Figure 1:
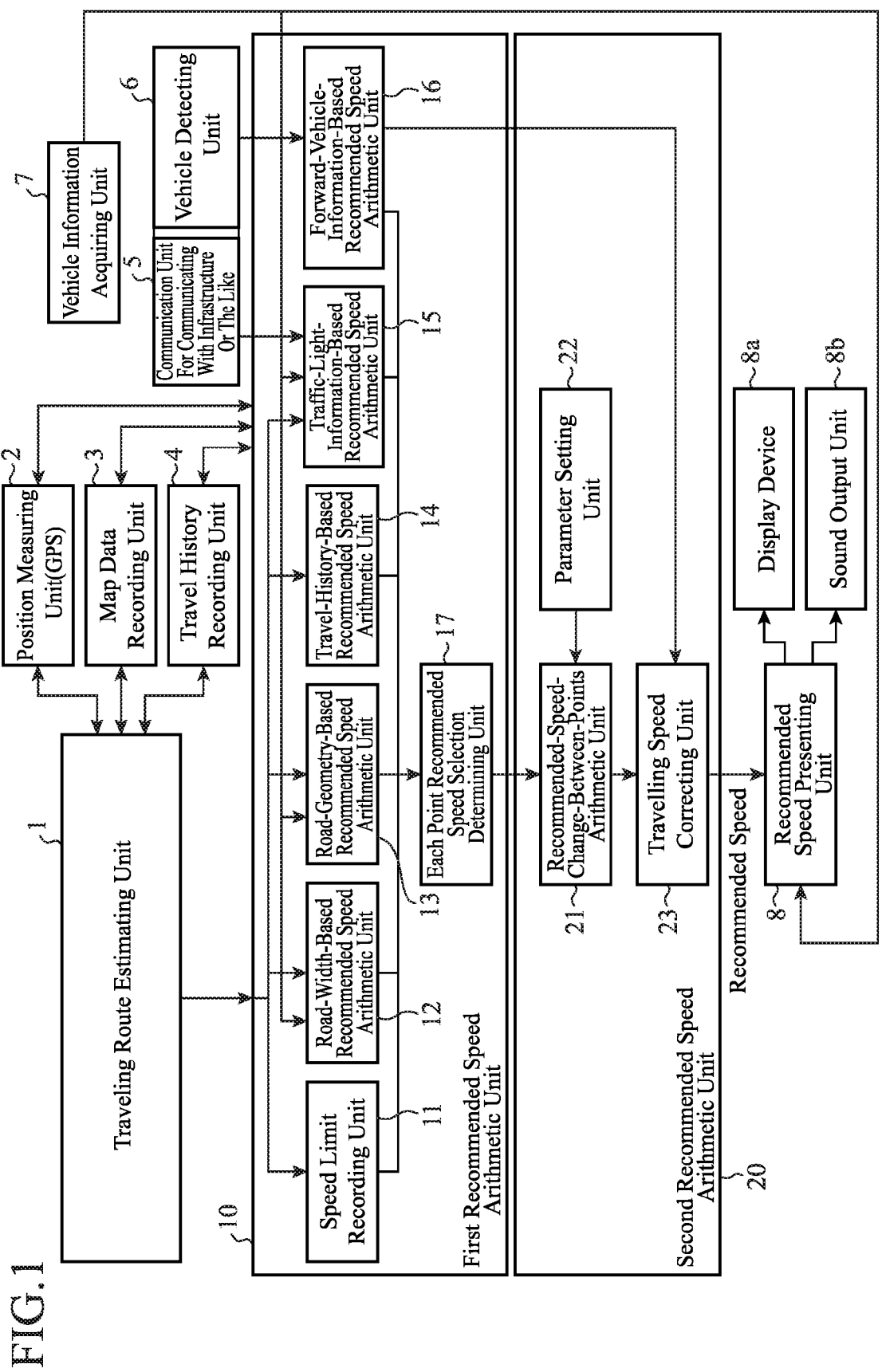
FIG. 1 is a block diagram showing the structure of a recommended speed presentation device in accordance with Embodiment 1 of the present invention.

FIG. 1 is a block diagram showing the structure of a recommended speed presentation device in accordance with Embodiment 1 of the present invention. In this Embodiment 1, a case in which a car navigation device also has the functions of the recommended speed presentation device will be explained. Referring to FIG. 1, the recommended speed presentation device in accordance with Embodiment 1 is mounted in, for example, a vehicle (referred to as a self-vehicle from here on) as a vehicle-mounted information device and presents a recommended speed depending on a road state to a driver, and is provided with a traveling route estimating unit 1, a position measuring unit 2, a map data recording unit 3, a travel history recording unit 4, a communication unit 5 for communicating with an infrastructure or the like, a vehicle detecting unit 6, a vehicle information acquiring unit 7, a recommended speed presenting unit 8, a first recommended speed arithmetic unit 10, and a second recommended speed arithmetic unit 20. The recommended speed presentation device and the car navigation device can be alternatively disposed as individual devices. A recommended speed arithmetic device without a recommended speed presenting unit, and a recommended speed presenting unit can be combined. A recommended speed arithmetic device and a car navigation device can be combined in such a way that the recommended speed arithmetic device computes a recommended speed on the basis of information inputted thereto from the car navigation device, and the car navigation device presents the recommended speed to the driver.

The traveling route estimating unit 1 is a component for estimating a route along which the self-vehicle is assumed to travel within a predetermined region from the current position of the self-vehicle, and estimates a traveling route on the basis of the current position of the self-vehicle measured by the position measuring unit 2, the map data about an area including the road along which the self-vehicle is traveling and a surrounding area, the map data being read from the map data recording unit 3, and information showing a history of travels which were made by the self-vehicle, the travel history information being read from the travel history recording unit 4. Further, when a route guidance is being carried out in the vehicle, the traveling route estimating unit 1 determines a route (guidance route) which has been searched for by the car navigation device as a traveling route.

The position measuring unit 2 is a component for measuring the current position of the self-vehicle by using information from, for example, a GPS (Global Positioning System) receiver, or a speed sensor, an acceleration sensor, an angular velocity sensor, and so on, and provides the traveling route estimating unit 1 with the current position information measured thereby. The map data recording unit 3 is a storage unit, such as a memory or a hard disk, in which map data used for a map display in navigation processing or the like are recorded. Each road data in the map data include the road geometries, such as a curve and a T-junction, the road width, the number of lanes, the road type, the road speed limit (legal speed), etc. of the road. The road type shows a category, such as a local street, a highway (in a suburb), or a highway (in an urban area). The travel history recording unit 4 is a storage unit in which travel history data about roads along which the self-vehicle traveled in the past are recorded. The travel history data include the roads along which the self-vehicle traveled in the past, and data about the traveling speed at which the self-vehicle traveled and the traveling time zone within which the self-vehicle traveled in each case.

The communication unit 5 for communicating with an infrastructure or the like is a component for communicating with an infrastructure, such as pieces of road side communications equipment disposed on roads, and a communication unit mounted in another vehicle, and acquires information including traffic light information about traffic lights disposed in the traveling direction of the self-vehicle, information about the driving lane along which the self-vehicle is traveling, and information about other vehicles via the infrastructure. The vehicle detecting unit 6 is a component for detecting a forward vehicle traveling in front of the self-vehicle, and is provided with a sensor, such as a radar or a camera, for detecting a forward vehicle traveling in front of the self-vehicle. A forward vehicle traveling in front of the self-vehicle can be not only a four-wheeled vehicle but also a two-wheeled vehicle or a bicycle. Further, when a pedestrian, an obstacle, or the like exists in front of the self-vehicle, the vehicle detecting unit 6 detects such an object. The vehicle information acquiring unit 7 is a component for acquiring information including an image captured by a vehicle-mounted camera, a wiper operating state, the vehicle speed, etc., from the vehicle. The recommended speed presenting unit 8 is a component for presenting the recommended speed computed by the first recommended speed arithmetic unit 10 and the recommended speed computed by the second recommended speed arithmetic unit 20 to the driver by using a display device 8a or a sound output unit 8b, and displays the recommended speed in each road section, a transition between the recommended speeds set for road sections, an acceleration or deceleration command for causing the vehicle speed to match a recommended speed, and a reason why the recommended speed has been changed (road state information) on the display device 8a. The recommended speed presenting unit 8 can also output these pieces of information by voice using the sound output unit 8b. The display device 8a displays information including the recommended speed. For example, the display device can be implemented by a display installed in the navigation device or a display disposed in the instrument panel of the vehicle for producing a graphics display of instruments. The display device 8a can be a liquid crystal display monitor or LEDs no matter what type it is. The sound output unit 8b is a component for outputting information including the recommended speed by voice, and can be a speaker disposed in order to present the recommended speed and so on to the user and can use speakers for use in a car audio device.

The first recommended speed arithmetic unit 10 is a component for computing a recommended speed in each road section on the traveling route of the self-vehicle estimated by the traveling route estimating unit 1 on the basis of the road state information showing the road state by using a plurality of methods. For example, the first recommended speed arithmetic unit computes a recommended speed in each of road sections corresponding to one of various pieces of road state information on the traveling route, such as a road section on the traveling route in which a speed limit is defined, a road section corresponding to each road geometry, such as the road width of each road on the traveling route, a straight portion, a curve, or an intersection on the traveling route, a road section extending up to a signalized intersection determined according to the traffic light information, and a road section in which a forward vehicle traveling in front of the self-vehicle is detected and for which a recommended speed is computed by using a relationship between the self-vehicle and the other vehicle traveling in front of the self-vehicle. As components, the first recommended speed arithmetic unit includes a speed limit recording unit 11, a road-width-based recommended speed arithmetic unit 12, a road-geometry-based recommended speed arithmetic unit 13, a travel-history-based recommended speed arithmetic unit 14, a traffic-light-information-based recommended speed arithmetic unit 15, a forward-vehicle-information-based recommended speed arithmetic unit 16, and an each point recommended speed selection determining unit 17.

The speed limit recording unit 11 is a storage unit for recording the speed limits defined on the traveling route, and, when a traveling route is estimated by the traveling route estimating unit 1, records the speed limit for each road section on the above-mentioned traveling route in which the speed limit is defined therein. For example, when the speed limit imposed on each road section is registered in the map data recording unit 3 in advance, the speed limit recording unit 11 records the speed limit imposed on each road section on the traveling route which is read from the map data recording unit 3 therein. The vehicle does not have to have the speed limit information, and the recommended speed presentation device can alternatively acquire the road speed limit imposed on the road along which the self-vehicle is traveling from the speed limit information stored in a server device disposed outside the vehicle and record the road speed limit information in the speed limit recording unit 11. As an alternative, the recommended speed presentation device can capture an image of a sign disposed above the road or in the vicinity of the road by using a camera mounted in the self-vehicle to record the result of carrying out image recognition on the camera image captured thereby to determine the speed limit described on the sign in the speed limit recording unit 11. The recommended speed presentation device can alternatively receive the speed limit information transmitted thereto via a light beacon or DSRC (Dedicated Short Range Communications) from road side communications equipment by using the communication unit 5 for communicating with an infrastructure or the like to record the speed limit information in the speed limit recording unit 11. The speed limit recording unit 11 can be constructed as an independent database disposed separately from the recommended speed presentation device in accordance with the present invention, or can be constructed as a part of the storage area of the map data recording unit 3.

The road-width-based recommended speed arithmetic unit 12 is a component for computing a recommended speed depending on the road width of the road along which the self-vehicle is traveling. When acquiring the road width, the number of lanes, and the road type of the road along which the self-vehicle is traveling, the road-width-based recommended speed arithmetic unit 12 determines a recommended speed depending on the road width of the road along which the self-vehicle is traveling by referring to table data showing a correspondence between an appropriate recommended speed and the number of lanes and the road width of each preset road type. The road-width-based recommended speed arithmetic unit 12 also uses the road width information extracted from the road data about the traveling route recorded in the map data recording unit 3. The road width information can be recorded in the map data recording unit 3 as road data in the map data. As an alternative, the road width information can be registered in an independent map database disposed separately from the recommended speed presentation device in accordance with the present invention, and the road width information about the roads on the traveling route can be read from the map database when necessary and can be used. The recommended speed presentation device can alternatively receive the road width information transmitted thereto via a light beacon or DSRC from road side communications equipment by using the communication unit 5 for communicating with an infrastructure or the like to use the road width information, like in the case of receiving the speed limit information from road side communications equipment. As an alternative, the recommended speed presentation device can capture an image of the road along which the self-vehicle is traveling by using a camera mounted therein to carry out image recognition on the camera image captured thereby to determine the road width of the road along which the self-vehicle is traveling, or can use a sensor, such as a laser radar mounted in the self-vehicle, to use the result of measuring the road width.

The road-geometry-based recommended speed arithmetic unit 13 is a component for computing a recommended speed depending on a road geometry such as a curve or a T-junction. For example, the road-geometry-based recommended speed arithmetic unit computes a traveling speed equal to or lower than a setting which enables the self-vehicle to go round a curve with safety even through a horizontal G-force is applied to the self-vehicle according to the curve radius of the road when the self-vehicle is going round the curve, and sets the traveling speed computed thereby as a recommended speed in the curve. The road-geometry-based recommended speed arithmetic unit can determine the radius of the curve from the road data recorded in the map data recording unit 3. The travel-history-based recommended speed arithmetic unit 14 is a component for computing a recommended speed from the part road state information included in the history of travels along roads along which the self-vehicle traveled in the past. For example, the recommended speed presentation device stores the traveling speed at which the self-vehicle traveled along any road in the past as an event of the travel history, and, when the traveling route includes a road along which the self-vehicle traveled in the past, and computes the average of the traveling speeds included in the past road state information of the travel history as a recommended speed. The recommended speed presentation device does not have to store any event of the travel history therein, and can alternatively include a communication unit for successively communicating with a server device disposed outside the vehicle to transmit traveling state information and use the travel history stored in the server device. At this time, the recommended speed presentation device can use the travel history of another vehicle of the same vehicle type.

The traffic-light-information-based recommended speed arithmetic unit 15 is a component for determining the time that a traffic light on the traveling route will change when the self-vehicle approaches the traffic light on the basis of the traffic light information about the traffic light on the traveling route which the recommended speed presentation device acquires from outside the recommended speed presentation device by using the communication unit 5 for communicating with an infrastructure or the like, and computing a speed which enables the self-vehicle to pass through the traffic light when the traffic light is green from the traffic light change time and the distance to the traffic light. For example, when the speed which enables the self-vehicle to pass through the traffic light when the traffic light is green is extremely low or high, the traffic-light-information-based recommended speed arithmetic unit determines that the self-vehicle needs to stop at the traffic light because the traffic light has turned red, and then determines a speed of zero at the stop line of the signalized intersection or a low speed as a recommended speed. The forward-vehicle-information-based recommended speed arithmetic unit 16 is a component for computing the distance and the speed difference between the self-vehicle and a forward vehicle traveling in front of the self-vehicle which is detected by the vehicle detecting unit 6 on the basis of the information about the forward vehicle to compute a recommended speed. In the example of FIG. 1, the case in which the vehicle detecting unit 6 is mounted in the self-vehicle is shown. As an alternative, the recommended speed presentation device can acquire the result of detecting a forward vehicle traveling in front of the self-vehicle which is detected by a roadside mounted sensor via communications, or can acquire the distance and the speed difference from a vehicle-mounted unit of the forward vehicle traveling in front the self-vehicle via vehicle-to-vehicle communications. The each point recommended speed selection determining unit 17 is a component for selecting a recommended speed at each point from the recommended speeds for each point (each road section) on the traveling route which are acquired by the speed limit recording unit 11 and the recommended speed arithmetic units 12 to 16. For example, when a plurality of recommended speeds are computed for an identical point on the traveling route, the each point recommended speed selection determining unit selects the lowest one of them in consideration of safe travels.

In the first recommended speed arithmetic unit 10, all of the speed limit recording unit 11 and the recommended speed arithmetic units 12 to 16 do not have to determine recommended speeds. For example, when the road-width-based recommended speed arithmetic unit 12 and the road-geometry-based recommended speed arithmetic unit 13, among the speed limit recording unit 11 and the recommended speed arithmetic units 12 to 16, are installed and recommended speeds are computed by the road-width-based recommended speed arithmetic unit and the road-geometry-based recommended speed arithmetic unit, the other recommended speed arithmetic units do not have to be operating. Further, in Embodiment 1, the structure provided with the speed limit recording unit 11 and the recommended speed arithmetic units 12 to 16 as the first recommended speed arithmetic unit 10 is shown in FIG. 1, a component using any method not using these components can be disposed as long as a recommended speed can be computed by using this method.

The recommended speed in each road section which is determined by the first recommended speed arithmetic unit 10 only shows a speed at which the self-vehicle can travel in the road section with safety, and differs according to the corresponding road section. The second recommended speed arithmetic unit 20 is a component for computing a recommended speed in a road section connecting between road sections, for which different recommended speeds are computed in that way, in such a way that the recommended speed continuously varies from that acquired for the preceding road section to that acquired for the next road section. The second recommended speed arithmetic unit includes a recommended-speed-variation-between-points arithmetic unit 21, a parameter setting unit 22, and a traveling speed correcting unit 23 as its components.

The recommended-speed-variation-between-points arithmetic unit 21 is a component for determining a speed variation function by using a parameter value set by the parameter setting unit 22, and computing a variation in the recommended speed between road sections in such away that the recommended speed in each road section acquired by the first recommended speed arithmetic unit 10 smoothly varies according to the speed variation function. The parameter setting unit 22 is a component for storing the parameter which is used for the determination of the speed variation function for defining acceleration or deceleration of the vehicle. Because a gasoline-powered vehicle, a diesel vehicle, an electric vehicle, a hybrid vehicle, a plugin hybrid vehicle, and a vehicle having another driving force differ in their respective power system characteristics, the acceleration or deceleration of the vehicle according to the speed variation function has an appropriate condition different dependently upon the operational characteristics of the type of the vehicle. Therefore, the parameter for determining the speed variation function for each vehicle type is disposed in the parameter setting unit 22 so that a speed variation according to the type of the vehicle can be implemented.

For example, in a case in which the self-vehicle is a gasoline-powered one, in order to maintain a fuel cut range in which the self-vehicle does not carry out fuel injection at a time of deceleration, the recommended-speed-variation-between-points arithmetic unit computes a recommended speed between a point where the recommended speed is high and a point where the recommended speed is low by using a slowly-decreasing speed variation function having a long time to maintain a high speed at which the fuel cut is enabled. In a case in which the self-vehicle is an electric vehicle (EV) or a hybrid vehicle (HV), in order to enable the self-vehicle to effectively use a regeneration brake using the motor as a dynamo, the recommended-speed-variation-between-points arithmetic unit computes a recommended speed between a point where the recommended speed is high and a point where the recommended speed is low by using a speed variation function of decreasing the speed in such a way that the amount of regenerative power generation is constant.

Although the recommended-speed-variation-between-points arithmetic unit 21 outputs the recommended speed at a certain point on the road, it is useless from the standpoint of using the recommended speed when the point is the current position or a one distant from the current position. The traveling speed correcting unit 23 is a component for correcting the recommended speed outputted from the recommended-speed-variation-between-points arithmetic unit 21 to a recommended speed at a predetermined point through which the self-vehicle will pass after a lapse of several seconds to over ten seconds from the current time from such a viewpoint. For example, the traveling speed correcting unit corrects the recommended speed outputted from the recommended-speed-variation-between-points arithmetic unit 21 to a recommended speed at a predetermined point through which the self-vehicle will pass after a lapse of several seconds to over ten seconds from the current time according to the current position and the vehicle speed of the self-vehicle. The information about a forward vehicle traveling in front of the self-vehicle, which is used for the arithmetic operation of computing a recommended speed by the forward-vehicle-information-based recommended speed arithmetic unit 16, is also inputted directly to the traveling speed correcting unit 23 in such a way that the information about a forward vehicle traveling in front of the self-vehicle which varies from moment to moment in a short time is promptly reflected in the recommended speed at the predetermined point. As a result, the recommended speed that will become a speed suitable for the self-vehicle in several seconds is outputted continuously.

Next, the operation of the recommended speed presentation device will be explained.

(1) Traveling Route Estimating Process

Figure 2:
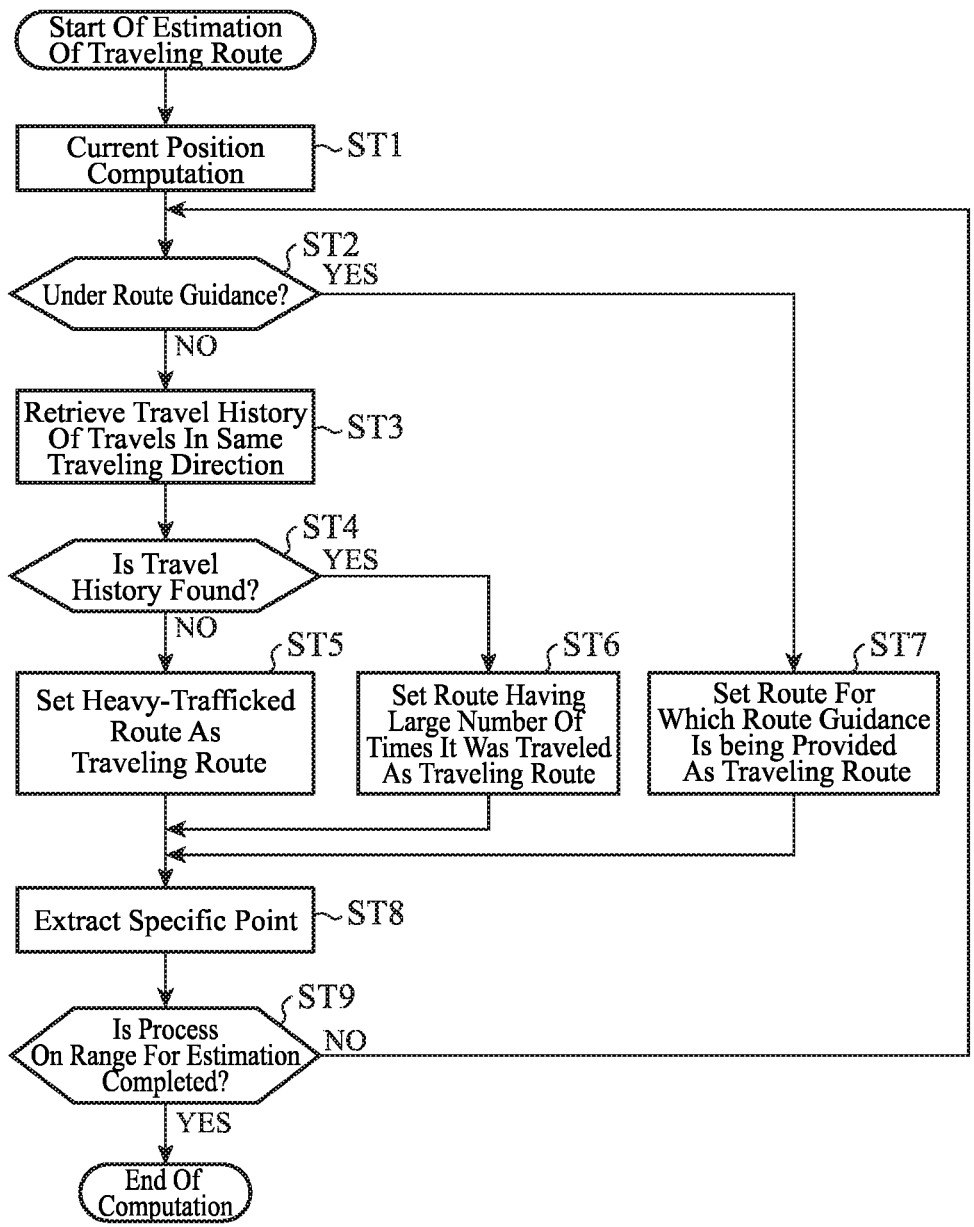
FIG. 2 is a flow chart showing a flow of a traveling route estimating process which is carried out by the recommended speed presentation device in accordance with Embodiment 1.

First, the process of estimating a traveling route of the self-vehicle will be explained. FIG. 2 is a flow chart showing a flow of the traveling route estimating process carried out by the recommended speed presentation device in accordance with Embodiment 1. When starting an estimation of a traveling route of the self-vehicle, the traveling route estimating unit 1 commands the position measuring unit 2 to measure the current position of the self-vehicle first. An estimation of a traveling route of the self-vehicle can be started when the vehicle is started, every time when the vehicle travels a fixed distance, or every time when the vehicle reaches a branch intersection. In accordance with the present invention, the time that the recommended speed presentation device starts an estimation of a traveling route and the time intervals at which the recommended speed presentation device starts an estimation of a traveling route are not limited. However, because the recommended speed presentation device needs a traveling route in order to compute a recommended speed, the recommended speed presentation device estimates a traveling route by using a certain method. When receiving the position measurement command from the traveling route estimating unit 1, the position measuring unit 2 measures the current position of the self-vehicle by using the GPS receiver or the like (step ST1). The measured current position information is outputted from the position measuring unit 2 to the traveling route estimating unit 1.

The traveling route estimating unit 1 then determines whether or not the car navigation device is performing route guidance according to a searched route for the self-vehicle (step ST2). When a destination is set and route guidance is being performed by the above-mentioned car navigation device (YES in step ST2), the traveling route estimating unit 1 advances to step ST8, and assumes that the route (guidance route) that is being provided during the route guidance by the above-mentioned car navigation device is a traveling route along which the self-vehicle which is scheduled to travel. In contrast, when determining that the car navigation device is not performing any route guidance (NO in step ST2), the traveling route estimating unit 1 reads the map data about roads in the surroundings of the self-vehicle from the map data recording unit 3 to identify the road along which the self-vehicle is currently traveling, and retrieves a travel history of travels in the same traveling direction on the road as the current traveling direction from the travel history recording unit 4 (step ST3). The traveling route estimating unit identifies the traveling direction of the self-vehicle from, for example, the direction of position movement which is determined from the acceleration sensor or the GPS receiver used for the measurement of the current position by the position measuring unit 2, detection information acquired by a heading sensor or the like, or the like.

When there is no travel history of travels in the same traveling direction as the current traveling direction in the travel history recording unit 4 (NO in step ST4), the traveling route estimating unit 1 identifies the road that is assumed to be most heavily trafficked from among the roads shown by the road data about an area in the surroundings of the self-vehicle which are recorded in the map data recording unit 3, and then assumes that a route connecting between the road identified thereby and the road along which the self-vehicle is traveling is a traveling route (step ST5). For example, the traveling route estimating unit estimates the traffic of each of the roads in consideration of, in addition to the past travel histories of the self-vehicle recorded in the travel history recording unit 4 and the traffic data included in the past travel histories of other vehicles, the road width and the road type of each of the roads in the area in the surroundings of the self-vehicle which are recorded in the map data recording unit 3. As the traffic data included in the past travel histories of other vehicles, the traveling route estimating unit acquires either past traffic data which are collected by an infrastructure, such as VICS (registered trademark), and which are recorded in the map data recording unit or traffic data, such as the traffic histories of other vehicles, by using probe information, such as information transmitted through telematics, via communications. In contrast, when there is a travel history of travels in the same traveling direction as the current traveling direction in the travel history recording unit 4 (YES in step ST4), the traveling route estimating unit 1 assumes that the route having the largest number of past travels, i.e., the route having the largest number of times the self-vehicle has traveled, this number of times being recorded in the travel history, is a traveling route (step ST6). The above-mentioned process of estimating a traveling route is an example, and the traveling route estimating unit can estimate a traveling route by using another method as long as the traveling route estimating unit can estimate a road along which the self-vehicle is scheduled to travel.

Figure 3:
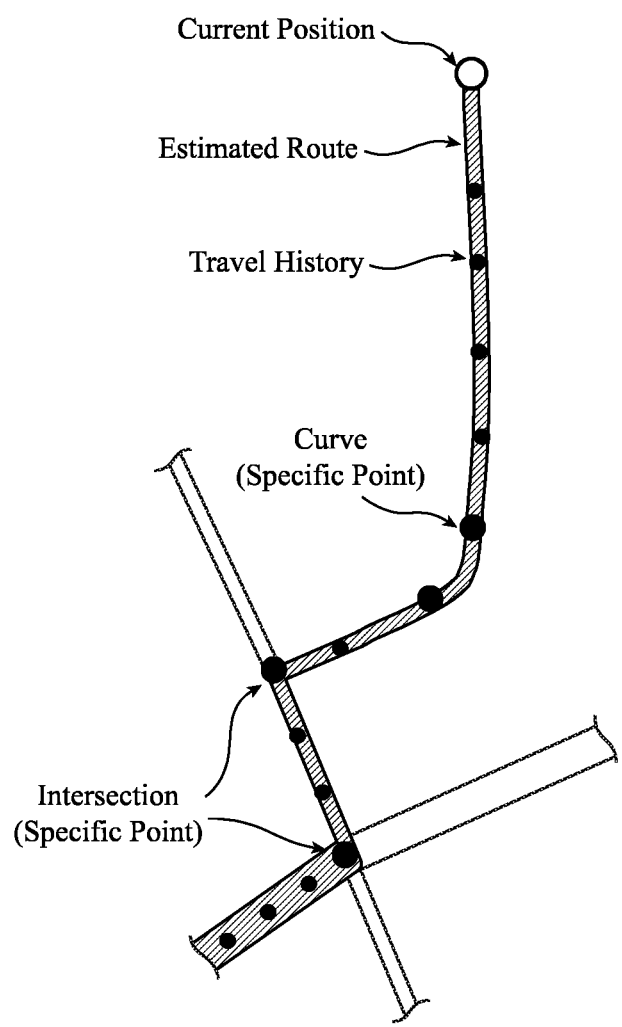
FIG. 3 is a diagram showing an example of the estimated traveling route.

After estimating a traveling route in either of steps ST5, ST6, and ST7, the traveling route estimating unit 1 extracts a specific point on the traveling route estimated thereby (step ST8). A specific point is information about a branch at an intersection or a point for defining a road geometry, such as a start point or an end point of a curve. The traveling route estimating unit can identify a specific point by using the road data about the traveling route recorded in the map data recording unit 3. FIG. 3 is a diagram showing an example of the estimated traveling route. In FIG. 3, roads to which hatch lines are added are the traveling route estimated, and each large black circle symbol on the traveling route shows a specific point. For example, points including a start point and an endpoint of a curve and a branch point at an intersection are specific points.

The traveling route estimating unit 1 then determines whether the traveling route estimating unit has completed the traveling route estimating process on a range in which the traveling route estimating unit has to estimate a traveling route (step ST9). The range in which the traveling route estimating unit has to estimate a traveling route is defined by a fixed distance from the current position. For example, an area of 500 m in front of the current position on the road along which the self-vehicle is traveling is defined as the range. In order for the driver to recognize the recommended speed presented by the recommended speed presentation device and to accelerate or decelerate the self-vehicle within the bounds of not suddenly performing an accelerating or braking operation to increase or decrease the speed of the self-vehicle to the recommended speed, when the recommended speed presented for the driver is the one at a point which the self-vehicle will reach while keeping the current speed after a lapse of 15 seconds, for example, the traveling route estimating unit needs to determine a point ahead of the self-vehicle by about 500 m when the upper limit on the current speed is 120 km/h. The traveling route estimating unit can change the range in which the traveling route estimating unit has to estimate a traveling route according to the traveling speed of the self-vehicle, and the road type of the road, such as a highway or a local street. In this case, the traveling route estimating unit can change the range in which the traveling route estimating unit has to estimate a traveling route to an area of 500 m or less in front of the current position according to the traveling speed of the self-vehicle. It is needless to say that the traveling route estimating unit can set the range in which the traveling route estimating unit has to estimate a traveling route to an area of 500 m or more in front of the current position when the self-vehicle is traveling along a road not having any branch on its way, such as a highway.

When completing the traveling route estimating process on the range in which the traveling route estimating unit has to estimate a traveling route (YES in step ST9), the traveling route estimating unit 1 ends the process of estimating a traveling route. In contrast, when having not completed the traveling route estimating process on the range in which the traveling route estimating unit has to estimate a traveling route yet (NO in step ST9), the traveling route estimating unit 1 returns to the process of step ST2 and then estimates a traveling route extending from the next branch point on the road within the range in which the traveling route estimating unit has to estimate a traveling route. Information showing the traveling route which has been estimated in this way is outputted from the traveling route estimating unit 1 to each of the arithmetic units included in the first recommended speed arithmetic unit 10.

(2) Process of Computing Recommended Speeds which is Carried Out by the First Recommended Speed Arithmetic Unit 10

Figure 4:
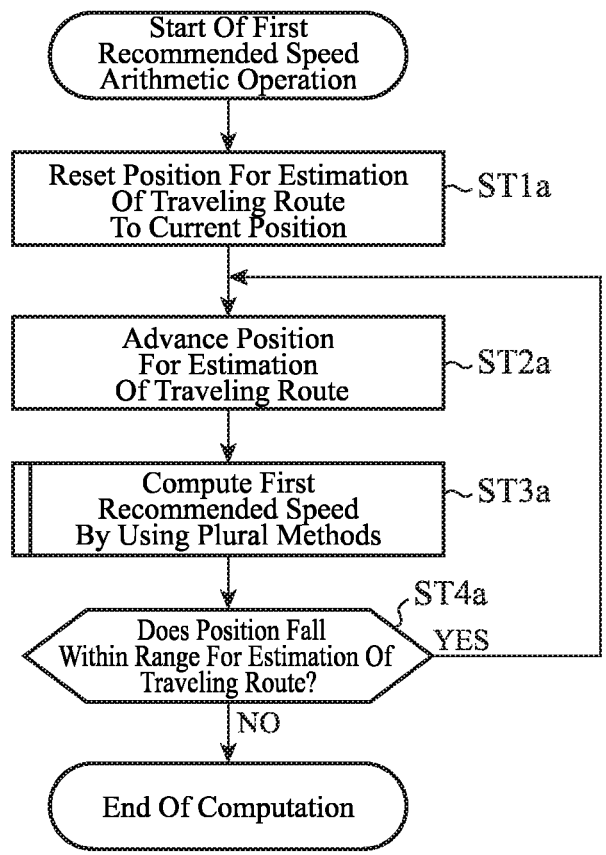
FIG. 4 is a flow chart showing a flow of a process of computing a recommended speed which is carried out by a first recommended speed arithmetic unit.

FIG. 4 is a flow chart showing a flow of the process of computing recommended speeds which is carried out by the first recommended speed arithmetic unit. An outline of the process of computing recommended speeds will be explained with reference to this FIG. 4. When receiving the information showing the traveling route estimated by the traveling route estimating unit 1, the first recommended speed arithmetic unit 10 starts the process of computing a recommended speed at each point on the traveling route. The first recommended speed arithmetic unit 10 resets a position for the estimation of the traveling route by the traveling route estimating unit 1 (a traveling start point on the traveling route) to the current position first (step ST1a). As a result, the first recommended speed arithmetic unit starts the arithmetic operation of computing a recommended speed from the current position. Next, the first recommended speed arithmetic unit 10 advances the position on the road in the traveling route estimated by the traveling route estimating unit 1 by a predetermined distance (which will be mentioned below) or to the next specific point (step ST2a). Next, the first recommended speed arithmetic unit 10 computes a recommended speed at the next position on the road to which the previous position is advanced in step ST2a by using each of a plurality of methods. More specifically, the first recommended speed arithmetic unit 10 computes recommended speeds according to the speed limit, the road width, the road geometry, the travel history, the traffic light information, and the information about a forward vehicle traveling in front of the self-vehicle, respectively (step ST3a). The details of the process of computing recommended speeds which is carried out by the first recommended speed arithmetic unit 10 will be explained with reference to FIG. 5 and subsequent figures.

After that, the first recommended speed arithmetic unit 10 determines whether the point for which recommended speeds have been computed falls within the range of roads which are estimated as the traveling route, i.e., whether the first recommended speed arithmetic unit has computed recommended speeds for each of all the specific points on the estimated traveling route (step ST4a). When the point for which recommended speeds have been computed is located outside the range of roads which are estimated as the traveling route (NO in step ST4a), the first recommended speed arithmetic unit ends the process. In contrast, when the point for which recommended speeds have been computed falls within the range of roads which are estimated as the traveling route (YES in step ST4a), the first recommended speed arithmetic unit 10 returns to the process of step ST2a, further advances the position on the road in the traveling route by the predetermined distance or to the next specific point, and carries out the subsequent processes.

(2-1) Recording a Speed Limit

Figure 5:
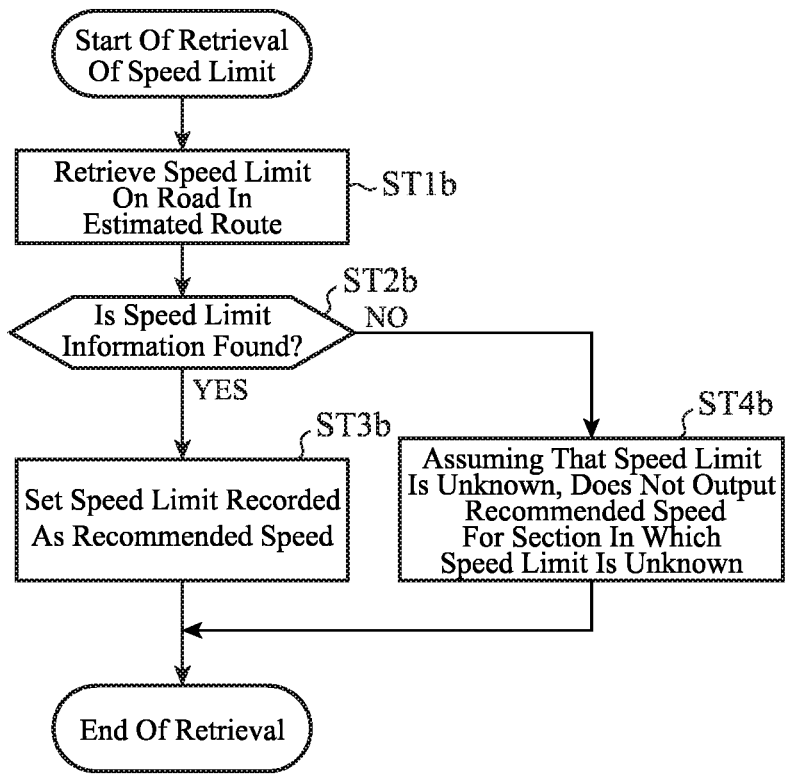
FIG. 5 is a flow chart showing a flow of a process of retrieving a speed limit.

FIG. 5 is a flow chart showing a flow of a process of retrieving speed limit information. The details of the process of retrieving speed limit information will be explained with reference to this FIG. 5. After estimating a traveling route in the above-mentioned way, the traveling route estimating unit 1 retrieves the speed limit information about the traveling route from the map data recorded in the map data recording unit 3 first (step ST1b). Although the case in which the speed limit information is recorded in the map data recording unit 3 in advance is shown, the traveling route estimating unit can be alternatively constructed in such a way as to retrieve the speed limit information stored in a map database disposed outside the vehicle via communications using the communication unit 5 for communicating with an infrastructure or the like.

When finding the speed limit information about the traveling route (YES in step ST2b), the traveling route estimating unit 1 reads the speed limit information about the traveling route from the map data recording unit 3 and records the speed limit information in the speed limit recording unit 11 (step ST3b). The speed limit recorded in the speed limit recording unit 11 is the recommended speed which is provided by the speed limit recording unit 11. In contrast, when not finding the speed limit information about the traveling route (NO in step ST2b), the traveling route estimating unit 1 determines that the speed limit is unknown in the road section shown by the traveling route, and does not record any speed limit information in the speed limit recording unit 11 (step ST4b). As a result, the traveling route estimating unit does not output the recommended speed determined by the speed limit recording unit 11 for this road section.

Figure 6:
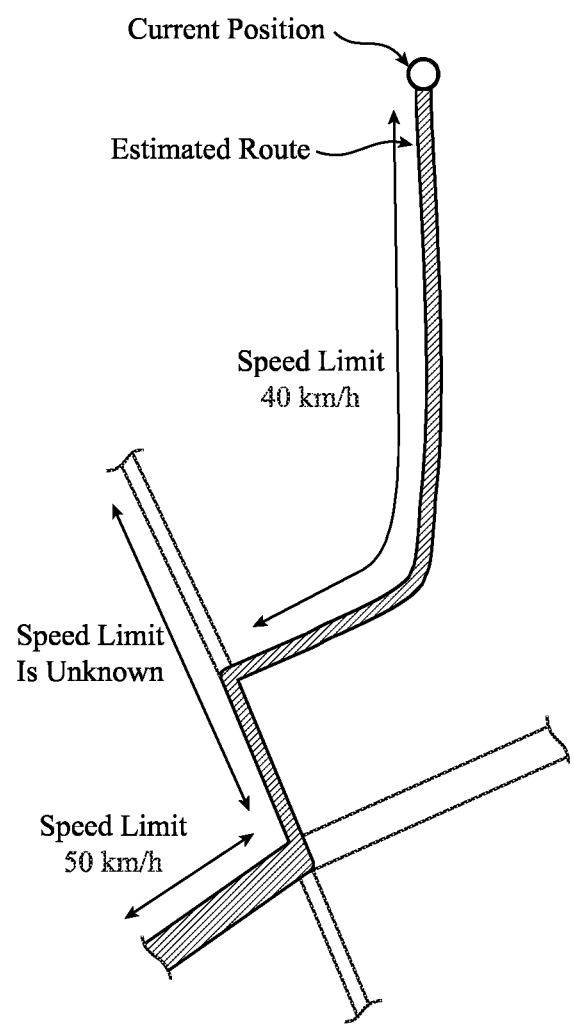
FIG. 6 is a diagram showing an example of speed limits in the estimated traveling route.

FIG. 6 is a diagram showing an example of the speed limits in an estimated traveling route. In FIG. 6, roads to which hatch lines are added are the traveling route estimated. Further, while the speed limit in a road section from the current position to the first branch point is 40 km/h and the speed limit in a road section extending forward from the next branch point is 50 km/h, the speed limit in a road section from the first branch point to the next branch point is unknown. In this case, the speed limit is recorded in the speed limit recording unit 11 for any road section for which the speed limit information has been retrieved, and is the recommended speed which the speed limit recording unit 11 provides for this road section.

The above-mentioned process descriptions are an example, and another method of being able to set a speed limit in a traveling route can be alternatively used. Further, although not shown in the figure, when the speed limit is changed, such as when it is snowing, the traveling route estimating unit acquires the speed limit from an infrastructure side, such as road side communications equipment, via communications using the communication unit 5 for communicating with an infrastructure or the like, and defines the speed limit as a recommended speed. In addition, for a tunnel entrance in which a traffic jam easily occurs and for a section, called a sag section, where a road changes from a downhill slope to an uphill slope, the traveling route estimating unit can acquire the speed limit from an infrastructure side, such as road side communications equipment, via communications using the communication unit 5 for communicating with an infrastructure or the like, and increases the speed limit acquired thereby by a predetermined value to determine a speed and define this speed as a recommended speed. The recommended speed presentation device can prevent the self-vehicle from making a speed reduction at a tunnel entrance or in a sag section by urging the driver to drive the self-vehicle at this recommended speed, thereby being able to prevent the occurrence of a traffic jam. The recommended speed presentation device identifies each point where a speed reduction easily occurs, such as a tunnel entrance or a sag section, from tunnel data and slope data in the map data. As an alternative, the recommended speed presentation device can determine each point where information, such as caution against speed reduction, is distributed from an infrastructure communication device disposed in a sag section or the like (a test on spot communications using DSRC was being carried out on February, 2011 in Japan) as a point where a speed reduction easily occurs.

(2-2) Process of Computing a Recommended Speed on the Basis of a Road Width

Figure 7:
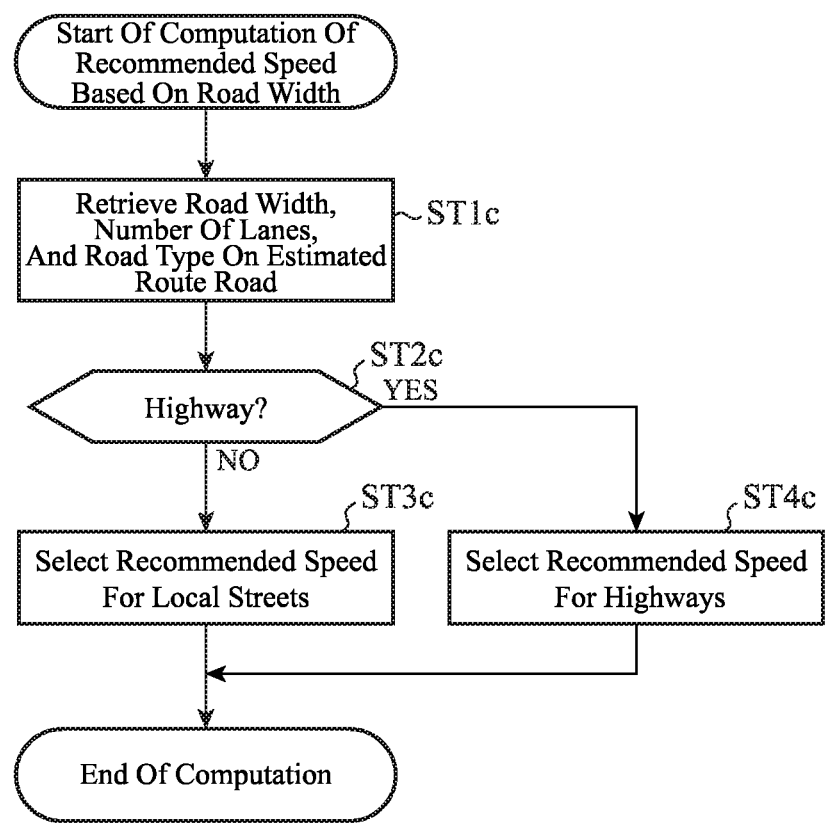
FIG. 7 is a flow chart showing a flow of a process of computing a recommended speed on the basis of a road width.

FIG. 7 is a flow chart showing a flow of the process of computing a recommended speed on the basis of a road width. The details of the process carried out by the road-width-based recommended speed arithmetic unit 12 will be explained with reference to this FIG. 7. When receiving the information showing the traveling route from the traveling route estimating unit 1, the road-width-based recommended speed arithmetic unit 12 retrieves the road width, the number of lanes, and the road type of the road on the traveling route from the road data recorded in the map data recording unit 3 (step ST1c). The road type shows a category, such as a local street, a highway (in a suburb), or a highway (in an urban area), as mentioned above.

The road-width-based recommended speed arithmetic unit 12 then determines whether or not the road on the traveling route is a highway from the road type acquired as a retrieved result (step ST2c). When the road on the traveling route is not a highway but a local street (NO in step ST2c), the road-width-based recommended speed arithmetic unit 12 selects the recommended speed corresponding to the local street (step ST3c). In contrast, when the road on the traveling route is a highway (YES in step ST2c), the road-width-based recommended speed arithmetic unit 12 selects the recommended speed corresponding to the highway (step ST4c).

FIG. 8 is a diagram showing an example of table data showing a correspondence between recommended speeds and road widths, FIG. 8(a) shows a correspondence between recommended speeds and road widths for local streets, and FIG. 8(b) shows a correspondence between recommended speeds and road widths for highways. In the table data shown in FIG. 8, in addition to a correspondence between recommended speeds and road widths, a correspondence between the numbers of lanes and recommended speeds is also defined. A road width including that of opposite lanes is recorded for each local street as data in many cases. Therefore, in the example shown in FIG. 8(a), a full width including the width of opposite lanes and the widths of the side strips for pedestrian is defined as each road width. As shown in FIG. 8(a), in the case of local streets, a higher recommended speed is set to a road section having a larger number of lanes and having a wider road width while a lower recommended speed is set to a road section having a smaller number of lanes or a narrower road width in relation to the number of lanes. For example, as the recommended speed in each road section, a speed that is set to be higher or lower within the limit of the legal speed according to the section is used.

Further, as shown in FIG. 8(b), because multiple lanes of traffic going in opposite directions are separated from each other in a highway, the width of each side of the highway is defined as its width. Highways are grouped into metropolitan highways running in an urban area and having a relatively narrow width and many curves, and highways in suburbs each of which connects between towns or cities. As shown in FIG. 8(b), different recommended speeds are assigned to a highway in a town or city and a highway in a suburb, respectively, even though they have the same number of lanes and the same road width. The above-mentioned table data as shown in FIGS. 8(a) and 8(b) are preset to the road-width-based recommended speed arithmetic unit 12, and the road-width-based recommended speed arithmetic unit refers to this table data on the basis of the road width, the number of lanes, and the road type of the road on the traveling route, which are acquired as the retrieved results in step ST1c, to select the recommended speed based on the road width of the road on the traveling route (steps ST3*c* and ST4*c*).

Although the case in which the road width of the road is recorded in the map data recording unit 3 in advance or the recommended route presentation device acquires the road width from outside the recommended route presentation device via communications is shown in the above-mentioned explanation, the recommended route presentation device can determine a recommended speed from the width of the driving lane along which the self-vehicle is traveling when the recommended route presentation device can determine the driving lane width by carrying out an image recognition on a camera image of the road captured by a vehicle-mounted camera. For example, when the self-vehicle is traveling in a road section whose driving lane width is equal to or larger than 3.3 m, and hence the driver can drive the self-vehicle with composure, the recommended route presentation device can select a recommended speed set to a high value according to the road width to determine the recommended speed, whereas when the self-vehicle is traveling in a narrow road section whose driving lane width is smaller than 3.3 m, the recommended route presentation device can select a recommended speed set to a lower value according to the road width to determine the recommended speed. Further, although not illustrated in the figure, when being able to determine that the self-vehicle is in a situation in which the driver cannot easily see a front area, like in fog or in the night, from a reduction in the contrast or brightness of a video image captured by a vehicle-mounted camera, the current time, or the like, the recommended route presentation device can set the recommended speed to a lower value. For example, there is a case in which the speed limit of a highway in fog is limited to 50 km/h. In order to determine a recommended speed more finely, when being able to estimate the field of view in fog or in case of snowfall (the distance a vehicle driver needs to be able to see, the distance being referred to as the sight distance) from the contrast of the video image acquired by the vehicle-mounted camera, the recommended route presentation device defines a speed which enables the driver to stop the self-vehicle by reducing the vehicle speed with a fixed deceleration when visually finding an obstacle at the distance and stepping on the brake as the recommended speed.

(2-3) Process of Computing a Recommended Speed on the Basis of a Road Geometry

Figure 9:
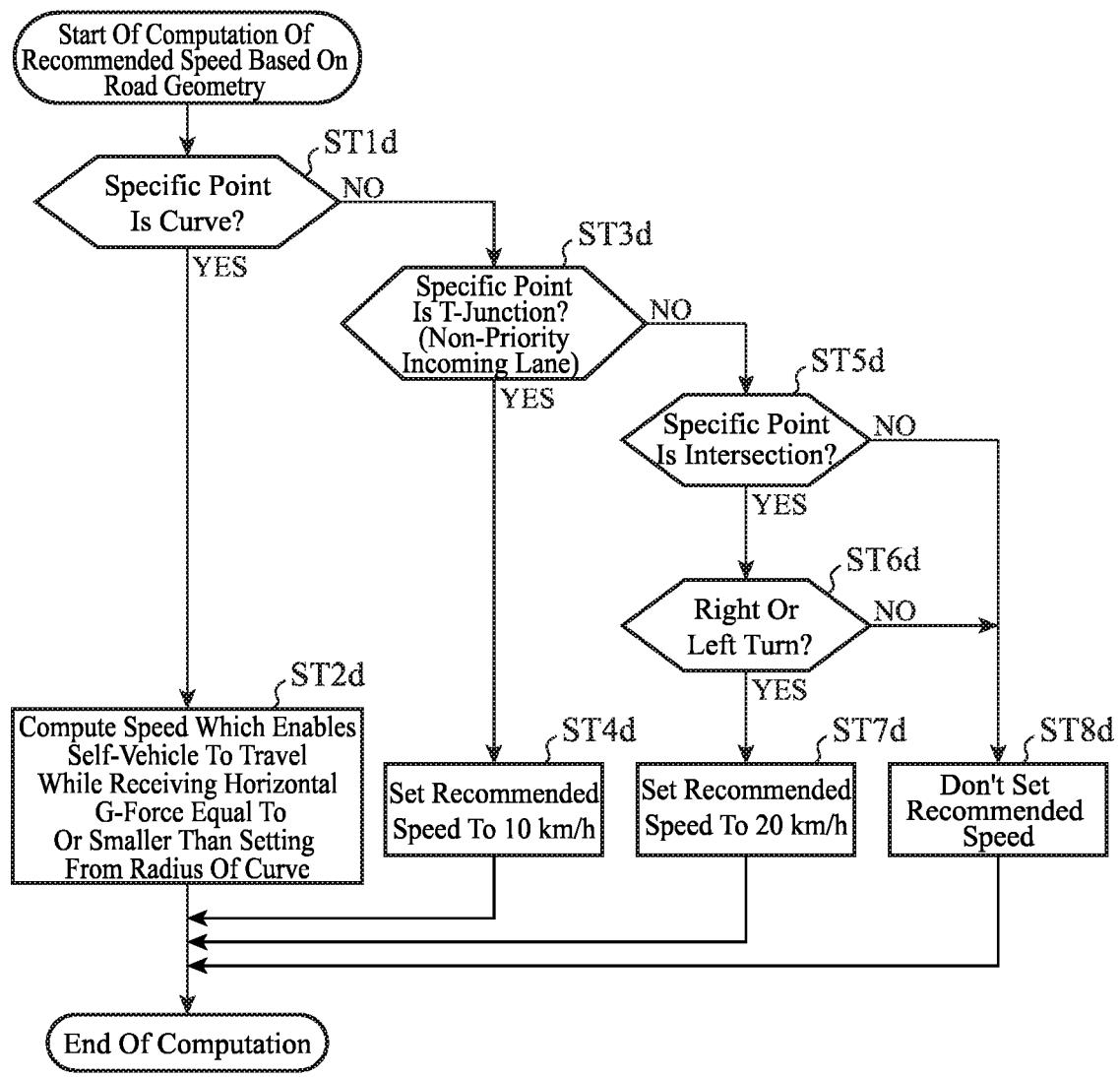
FIG. 9 is a flow chart showing a flow of a process of computing a recommended speed on the basis of a road geometry.

FIG. 9 is a flow chart showing a flow of the process of computing a recommended speed on the basis of a road geometry. The details of the process carried out by the road-geometry-based recommended speed arithmetic unit 13 will be explained with reference to this FIG. 9. When receiving the information showing the traveling route from the traveling route estimating unit 1, the road-geometry-based recommended speed arithmetic unit 13 determines whether or not a specific point on the traveling route is a curve first (step ST1*d*). When determining that the specific point is a curve (YES in step ST1*d*), the road-geometry-based recommended speed arithmetic unit 13 reads the radius of the curve from the road data recorded in the map data recording unit 3, and computes a traveling speed equal to or lower than a setting of an allowable upper limit speed which enables the self-vehicle to go around the curve with safety even when traveling through the specific point and receiving a horizontal G-force acting thereon on the basis of the radius of the curve to define the traveling speed as the recommended speed at the specific point (curve) (step ST2*d*).

In contrast, when determining that the specific point is not a curve (NO in step ST1*d*), the road-geometry-based recommended speed arithmetic unit 13 determines whether or not the specific point on the traveling route is a non-priority incoming lane of a T-junction at which the self-vehicle needs to stop when traveling forward on the basis of the road data recorded in the map data recording unit 3 (step ST3*d*). When determining that the specific point is a T-junction (YES in step ST3*d*), the road-geometry-based recommended speed arithmetic unit 13 defines 10 km/h which is preset as a low speed which enables the self-vehicle to promptly stop at the specific point as the recommended speed (step ST4*d*). This speed is an example, and the road-geometry-based recommended speed arithmetic unit can alternatively define 0 km/h showing a stop or about 15 km/h as the recommended speed.

In contrast, when determining that the specific point is not a T-junction (NO in step ST3*d*), the road-geometry-based recommended speed arithmetic unit 13 determines whether or not the specific point on the traveling route is an intersection (step ST5*d*). When determining that the specific point is an intersection (YES in step ST5*d*), the road-geometry-based recommended speed arithmetic unit 13 determines whether the self-vehicle will make a right or left turn at the intersection from the result of following the traveling route along the road (step ST6*d*). When determining that the self-vehicle will make a right or left turn at the intersection (YES in step ST6*d*), the road-geometry-based recommended speed arithmetic unit 13 defines 20 km/h which the road-geometry-based recommended speed arithmetic unit presets as a speed at the time of making a right or left turn as the recommended speed (step ST7*d*). This speed is an example, and the road-geometry-based recommended speed arithmetic unit can alternatively define 10 km/h which urges the driver to drive the self-vehicle slowly or 30 km/h when the intersection is a large one as the recommended speed.

In contrast, when determining that the specific point is not an intersection (NO in step ST5*d*) or when determining that the self-vehicle will go straight without making a right or left turn at the intersection (NO in step ST6*d*), the road-geometry-based recommended speed arithmetic unit 13 determines that the self-vehicle does not have to slow down, such as that the vehicle can go straight at the specific point, and does not set any recommended speed (step ST8*d*). In the example shown in FIG. 9, when completing the processes of steps ST2*d*, ST4*d*, ST7*d*, and ST8*d*, the recommended speed presentation device ends the recommended speed arithmetic operation based on the road geometry. This example simply shows a flow of the processes performed on the first specific point on the traveling route, and, when there is a specific point following the first specific point, the recommended speed presentation device repeatedly carries out the above-mentioned processes.

Because vehicles can easily slip at a curve when it is raining or snowing, when rainfall is detected from a wiper operation, the road-geometry-based recommended speed arithmetic unit 13 reduces the setting of the horizontal G-force to set the recommended speed to a lower value. Further, when the outside air temperature (which is measured by a sensor because the outside air temperature is information necessary in order to control both the temperature of the air inhaled by the engine, and the engine) is low and road surfaces are predicted to be frozen, the road-geometry-based recommended speed arithmetic unit can determine points, such as bridges, shaded curves, and tunnel entrances and exits, where road surfaces are easily freezing from the map data, define them as specific points, and compute setting speeds in such a way that these setting speeds are lower than their typical speeds. In this case, the road-geometry-based recommended speed arithmetic unit 13 sets specific points on the traveling route again on the basis of the road data recorded in the map data recording unit

3 to set such points as above as specific points. In addition, in a case in which slope information is added to the data about the road geometry, the road-geometry-based recommended speed arithmetic unit can carry out a process of reducing the setting of the horizontal G-force to a value smaller than that when the vehicle travels a flat ground and that when the vehicle goes around an uphill curve to reduce the recommended speed when it is predicted that the traveling of the vehicle becomes unstable even when the vehicle slows down, like when the vehicle goes around a downhill curve.

(2-4) Process of Computing a Recommended Speed on the Basis of a Travel History

Figure 10:
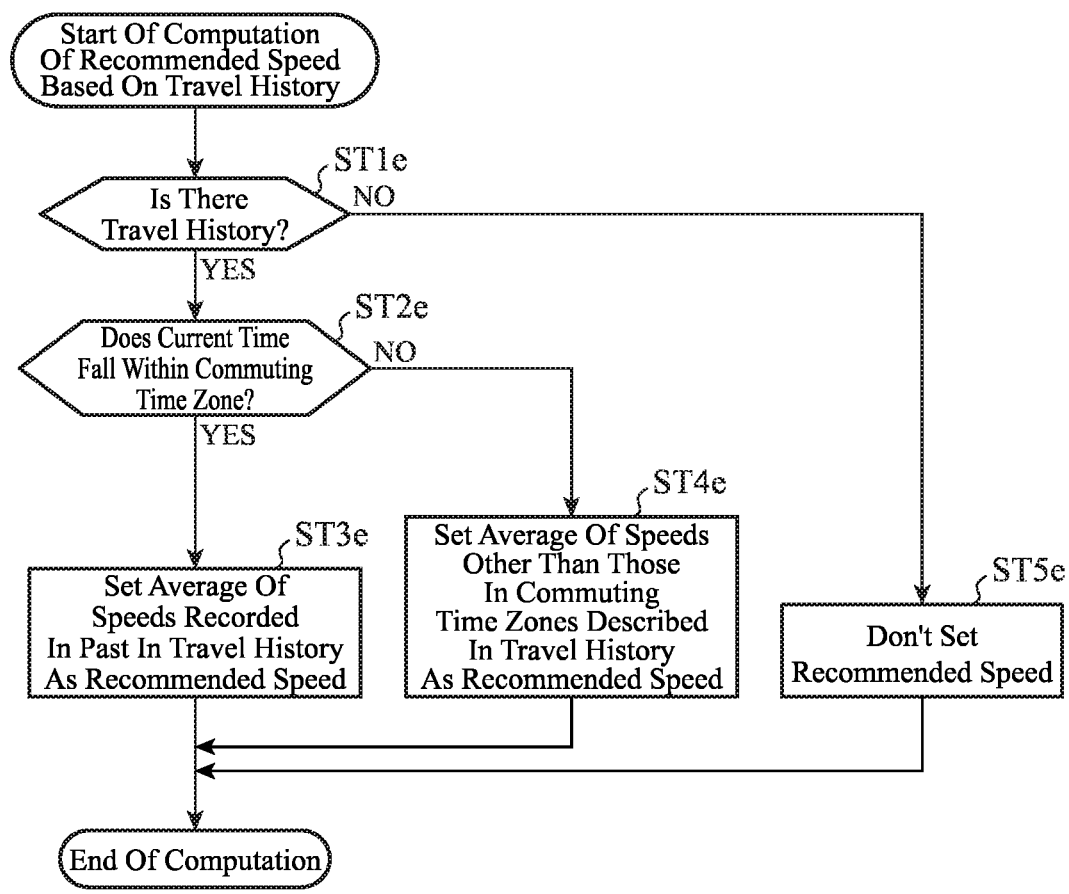
FIG. 10 is a flow chart showing a flow of a process of computing a recommended speed on the basis of a travel history.

FIG. 10 is a flow chart showing a flow of the process of computing a recommended speed on the basis of a travel history. The details of the process carried out by the travel-history-based recommended speed arithmetic unit 14 will be explained with reference to FIG. 10. When receiving the information showing the traveling route from the traveling route estimating unit 1, the travel-history-based recommended speed arithmetic unit 14 retrieves a travel history of travels along the traveling route from the travel histories recorded in the travel history recording unit 4 (step ST1e). When determining that there is no travel history of travels along the traveling route in the travel history recording unit 4 (NO in step ST1e), the travel-history-based recommended speed arithmetic unit 14 ends the process without setting any recommended speed (step ST5e).

In contrast, when determining that there is a travel history of travels along the traveling route in the travel history recording unit 4 (YES in step ST1e), the travel-history-based recommended speed arithmetic unit 14 determines whether or not the current time falls within a commuting time zone (step ST2e). The travel-history-based recommended speed arithmetic unit determines the commuting time zone in advance from the travel histories as follows. The travel-history-based recommended speed arithmetic unit analyzes the travel history of travels along the traveling route which is read from the travel history recording unit 4, and, when determining that the self-vehicle has traveled along the traveling route a predetermined number of times or more during a time zone in the morning or evening of a weekday, sets the time period defined by the traveling time zones and the days of the week in the travel history as the commuting time zone. When the travel histories of the self-vehicle do not have any history which the travel-history-based recommended speed arithmetic unit assumes has a travel using the traveling route for the driver's commute, the travel-history-based recommended speed arithmetic unit uses a time zone which is inputted in advance as the commuting time zone at the point. It is needless to say that the travel-history-based recommended speed arithmetic unit determines the commuting time zone on the basis of traffic jam information acquired via communications with an infrastructure or the like disposed outside the vehicle.

When the current time falls within a commuting time zone (YES in step ST2e), the travel-history-based recommended speed arithmetic unit 14 computes the average of the traveling speeds recorded in the past in the travel history of travels along the traveling route which is read from the travel history recording unit 4 to define the average as the recommended speed (step ST3e). In contrast, when the current time does not fall within any commuting time zone (NO in step ST2e), the travel-history-based recommended speed arithmetic unit 14 computes the average of the traveling speeds recorded in the past in the travel records other than those in commuting time zones, the travel records being included in the travel history of travels along the traveling route which is read from the travel history recording unit 4, to define the average as the recommended speed (step ST4e). When the average of the traveling speeds in commuting time zones in which a traffic jam easily occurs is used for a case in which the current time falls within a time zone other than commuting time zones, the recommended speed becomes low and this results in a cause of a traffic jam instead. Therefore, when the current time does not fall within any commuting time zone, the travel-history-based recommended speed arithmetic unit computes the average of the traveling speeds described in the past travel records other than those in commuting time zones, the travel records being included in the travel history, to define the average as the recommended speed.

A travel history of travels in each driving lane of a road along which the self-vehicle traveled in the past can be recorded in the travel history recording unit 4, and the travel-history-based recommended speed arithmetic unit 14 can compute a recommended speed in each driving lane of the road along which the self-vehicle is traveling. In this case, for example, the travel-history-based recommended speed arithmetic unit computes a higher recommended speed in a through lane, while computing a lower recommended speed in a lane close to the center line and connected to a dedicated turn lane in which vehicles waiting for right turns are aligned. Further, as a travel history of travels along a road where a restriction according to driving lanes is imposed on the number of passengers (e.g., in the United States, a priority lane along which only vehicles with two or more passengers are allowed to travel during a commuting time zone is disposed), the recommended speed presentation device can record information showing the number of passengers measured by sensors disposed in the seats and the driving lane along which the vehicle is traveling in the travel history recording unit 4, and, when the driving lane along which the vehicle is traveling is a priority lane, the travel-history-based recommended speed arithmetic unit 14 can compute a recommended speed in consideration of the current number of passengers and the information about the driving lane.

Although the case in which the travel histories of the self-vehicle are used is shown in the above-mentioned explanation, travel histories including those of other vehicles can be stored in a server device or the like disposed outside the vehicle, the travel-history-based recommended speed arithmetic unit can acquire the travel histories of other vehicles via communications with the server device to compute a recommended speed similarly. Further, speed information about the speed of the self-vehicle when the self-vehicle experienced a traffic jam in the past is described in a travel history, and this travel history is recorded in the travel history recording unit 4, and, when acquiring traffic jam information about the traveling route via communications using the communication unit 5 for communicating with an infrastructure or the like, the travel-history-based recommended speed arithmetic unit 14 can compute a recommended speed by using the speed information included in the travel history of travels at the times that the past traffic jams occurred.

Figure 11:
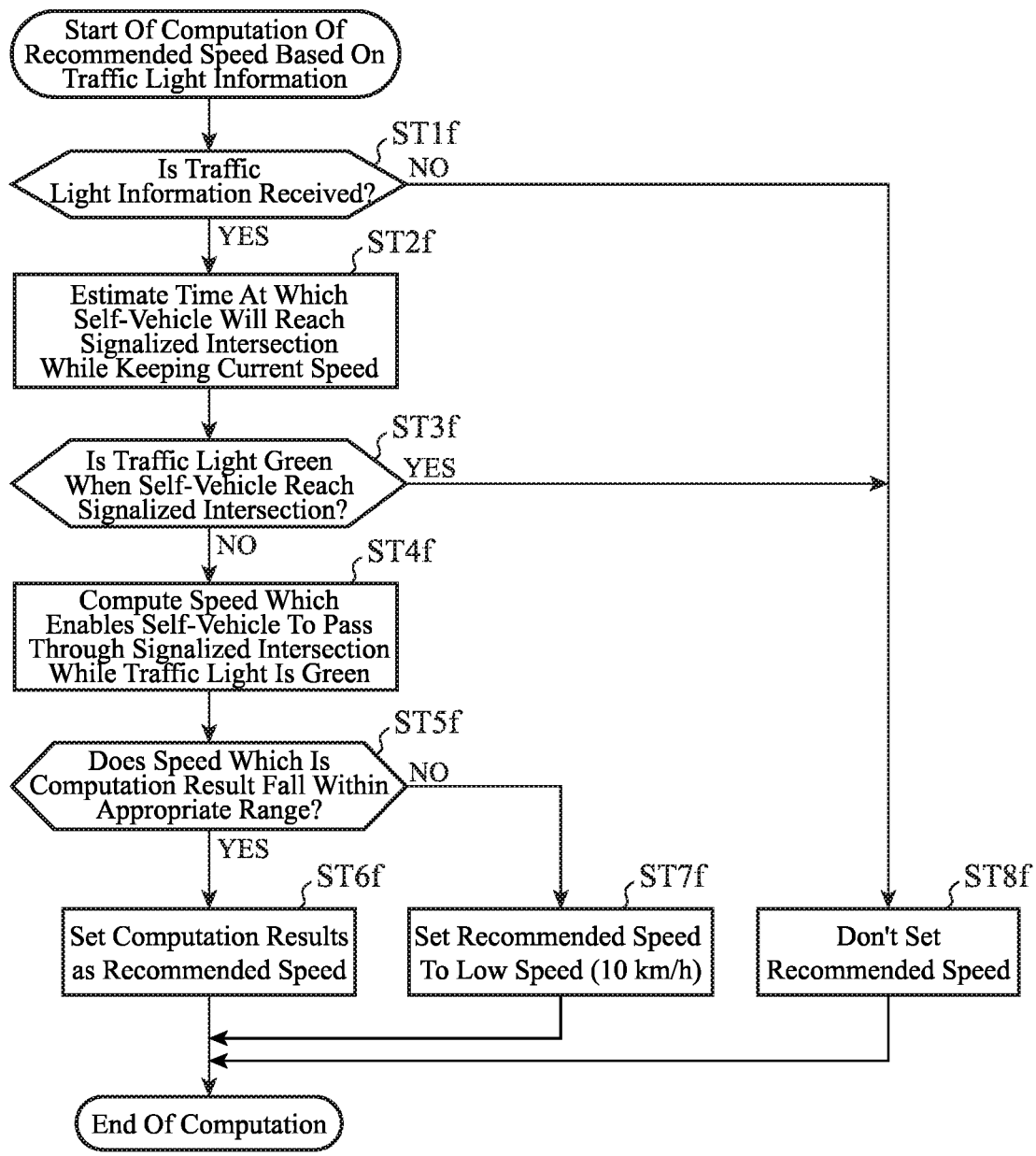
FIG. 11 is a flow chart showing a flow of a process of computing a recommended speed on the basis of traffic light information.

(2-5) Process of Computing a Recommended Speed on the Basis of Traffic Light Information FIG. 11 is a flow chart showing a flow of the process of computing a recommended speed on the basis of traffic light information. The details of the process carried out by the traffic-light-information-based recommended speed arithmetic unit 15 will be explained with reference to FIG. 11. When receiving the information showing the traveling route from the traveling route estimating unit 1, the traffic-light-information-based recommended speed arithmetic unit 15 determine whether or not traffic light information is received by the communication unit 5 for communicating with an infrastructure or the like (step ST1f). When traffic light information is received by the communication unit 5 for communicating with an infrastructure or the like (YES in step ST1f), the traffic-light-information-based recommended speed arithmetic unit 15 estimates the length of time required for the self-vehicle to reach the intersection with the traffic light shown by the above-mentioned traffic light information from the current position when the self-vehicle keeps the current traveling speed on the basis of the current position of the self-vehicle acquired from the position measuring unit 2 and the road data about the traveling route recorded in the map data recording unit 3 (step ST2f). Thus, unlike in the case of the above-mentioned processes of computing recommended speeds, the traffic-light-information-based recommended speed arithmetic unit 15 starts its substantial arithmetic operation of computing a recommended speed only when traffic light information is received.

The traffic-light-information-based recommended speed arithmetic unit 15 then analyzes the traffic light information received by the communication unit 5 for communicating with an infrastructure or the like to determine the times that the traffic light changes its color, and determines whether the self-vehicle can pass through the intersection with the traffic light while the traffic light is green, a green arrow or the like after a lapse of the length of time determined in step ST2f on the basis of the traffic light change times (step ST3f). When expecting that the traffic light turns red or the like when the self-vehicle reaches the signalized intersection while keeping the current vehicle speed to travel along the road, and determining that the self-vehicle cannot pass through the intersection without stopping at the intersection (NO in step ST3f), the traffic-light-information-based recommended speed arithmetic unit 15 determines a speed which enables the self-vehicle to pass through the signalized intersection while the traffic light is green, a green arrow, or the like as a candidate for the recommended speed in the section from the current position to the signalized intersection (step ST4f). The traffic-light-information-based recommended speed arithmetic unit computes a speed by increasing the current speed and also computes a speed by decreasing the current speed, and then uses an appropriate one of them as the speed which enables the self-vehicle to pass through the intersection while the traffic light is green, a green arrow, or the like. From the point of view of the safety and eco-driving, the recommendation of a recommended speed acquired by increasing the current speed to the driver is limited to a case in which the self-vehicle is traveling at an improperly slow speed, or the like. More specifically, there is a case in which a change in the current vehicle speed enables the self-vehicle to reach the signalized intersection when the traffic light has turned a color showing passageable, and therefore the traffic-light-information-based recommended speed arithmetic unit sets an appropriate speed which enables the self-vehicle to pass through the signalized intersection as a candidate for the recommended speed.

The traffic-light-information-based recommended speed arithmetic unit 15 then determines whether the speed determined in step ST4f falls within an appropriate range (step ST5f). It is needless to say that the appropriate range exceeds neither the speed limit nor the recommended speed computed from the road width. Further, the appropriate range is neither an extremely low speed range which causes fear of deterioration in the fuel efficiency, nor a speed range which causes a possibility that a reduction in the speed induces a succeeding vehicle to take a dangerous action, such as passing. For example, the appropriate range is the one equal to or higher than 20 km/h. Further, in a case in which a sensor, such as a camera, for monitoring a rear area in back of the self-vehicle is mounted in the self-vehicle, the traffic-light-information-based recommended speed arithmetic unit dynamically changes a low-speed setting of the above-mentioned appropriate range by, for example, increasing the low-speed setting to 30 km/h when the sensor detects that another vehicle is approaching the rear area in back of the self-vehicle, thereby preventing a risk of a succeeding vehicle passing the self-vehicle.

When the speed determined in step ST4f falls within the appropriate range (YES in step ST5f), the traffic-light-information-based recommended speed arithmetic unit 15 defines the speed as the recommended speed in the road section extending to the signalized intersection (step ST6f). In contrast, when the speed determined in step ST4f does not fall within the appropriate range (NO in step ST5f), the traffic-light-information-based recommended speed arithmetic unit 15 determines that the self-vehicle cannot pass through the signalized intersection at the appropriate speed without having to stop at the intersection, and sets a low speed (10 km/h) which enables the self-vehicle to stop at any time as the recommended speed. It is needless to say that the traffic-light-information-based recommended speed arithmetic unit can set a stop (0 km/h) as the recommended speed.

In contrast, when receiving no traffic light information by using the communication unit 5 for communicating with an infrastructure or the like (NO in step ST1f) or when determining that traveling while keeping the current vehicle speed enables the self-vehicle to reach the signalized intersection when the traffic light has turned green or the like, and pass through the signalized intersection without stopping at the intersection (YES in step ST3f), the traffic-light-information-based recommended speed arithmetic unit 15 does not set any recommended speed because the self-vehicle can pass through the signalized intersection without stopping at the intersection as long as the self-vehicle keeps the current vehicle speed (step ST8f). Although the traffic-light-information-based recommended speed arithmetic unit ends the recommended speed arithmetic operation based on the traffic light information after completing the processes of steps ST6f, ST7f, and ST8f in the example shown in FIG. 11, the traffic-light-information-based recommended speed arithmetic unit carries out the above-mentioned processes again when receiving traffic light information by the time the self-vehicle reaches a signalized intersection.

Figure 12:
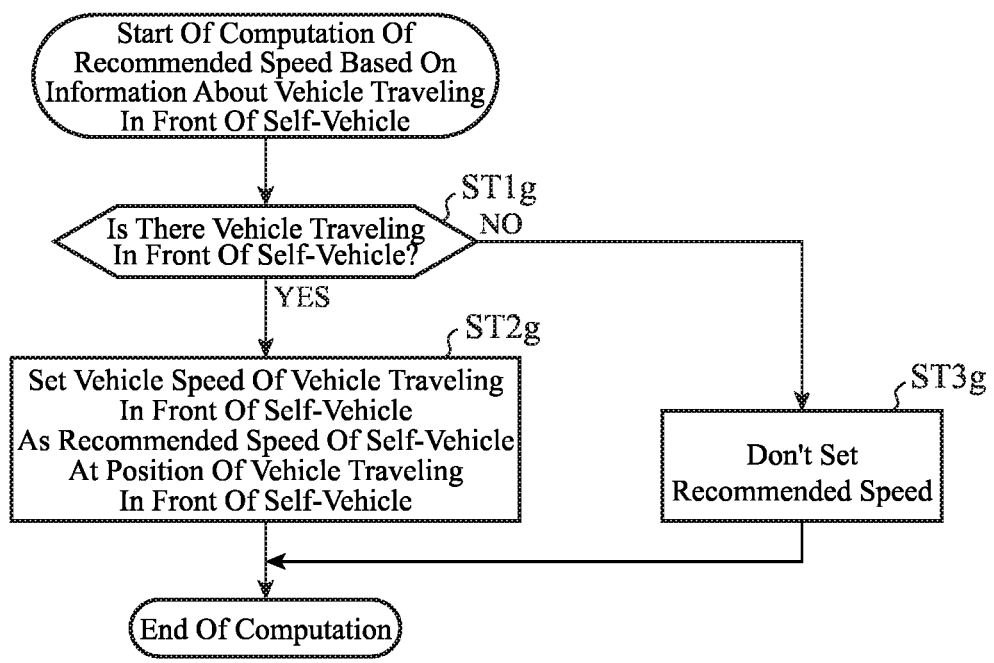
FIG. 12 is a flow chart showing a flow of a process of computing a recommended speed on the basis of forward vehicle information.

(2-6) Process of Computing a Recommended Speed on the Basis of Information about a Forward Vehicle Traveling in Front of the Self-Vehicle FIG. 12 is a flow chart showing a flow of the process of computing a recommended speed on the basis of information about a forward vehicle traveling in front of the self-vehicle. The details of the process carried out by the forward-vehicle-information-based recommended speed arithmetic unit 16 will be explained with reference to FIG. 12. When receiving the information showing the traveling route from the traveling route estimating unit 1, the forward-vehicle-information-based recommended speed arithmetic unit 16 determines whether the vehicle detecting unit 6 has detected a forward vehicle traveling in front of the self-vehicle (step ST1g). For example, the vehicle detecting unit 6 detects a forward vehicle traveling in front of the self-vehicle by determining whether or not an object is existing in a detection region thereof. When the vehicle detecting unit 6 uses a millimeter wave radar or the like, the detection region ranges from 1 m to about 200 m. When the vehicle detecting unit 6 uses a camera or the like, the detection region ranges up to about 100 m. Further, the detection accuracy of the millimeter wave radar or the like is about 1 m in distance, and is about 1 km/h in relative speed. When determining that there is a forward vehicle traveling in front of the self-vehicle (YES in step ST1g), the forward-vehicle-information-based recommended speed arithmetic unit 16 sets the current vehicle speed of the other vehicle traveling in front of the self-vehicle as a recommended speed of the self-vehicle at the position of the other vehicle traveling in front of the self-vehicle (step ST2g). This is because if the traveling speed of the self-vehicle is reduced to the speed of the other vehicle traveling in front of the self-vehicle when the self-vehicle reaches the position where the other vehicle traveling in front of the self-vehicle was traveling when the vehicle detecting unit 6 detected the other vehicle traveling in front of the self-vehicle while the self-vehicle has been traveling, a collision with the other vehicle traveling in front of the self-vehicle at the position can be avoided. Further, when a plurality of vehicles are detected as other vehicles traveling in front of the self-vehicle, the forward-vehicle-information-based recommended speed arithmetic unit sets the current vehicle speeds of the plurality of vehicles traveling in front of the self-vehicle as recommended speeds of the self-vehicle at the respective positions of the plurality of vehicles traveling in front of the self-vehicle. The position of each of the other vehicles traveling in front of the self-vehicle can be determined by using the current position acquired from the position measuring unit 2 and the distance between the self-vehicle and the other vehicle traveling in front of the self-vehicle which is detected by the vehicle detecting unit 6. The vehicle speed of each of the other vehicles traveling in front of the self-vehicle can be computed from, for example, a temporal change in the distance between the self-vehicle and the other vehicle traveling in front of the self-vehicle which is detected by the vehicle detecting unit 6, and the vehicle speed of the self-vehicle.

In contrast, when determining that there is no other vehicle traveling in front of the self-vehicle (NO in step ST1g), the forward-vehicle-information-based recommended speed arithmetic unit 16 does not set any recommended speed (step ST3g), and ends the processing. The forward-vehicle-information-based recommended speed arithmetic unit carries out the process of computing a recommended speed based on information about a forward vehicle traveling in front of the self-vehicle at predetermined intervals of, for example, about 0.1 seconds to 5 seconds, thereby making it possible for the detection of a forward vehicle traveling in front of the self-vehicle and the acceleration or deceleration of a forward vehicle traveling in front of the self-vehicle to be promptly reflected in the recommended speed. While a recommended speed is usually computed for each certain point which is a specific point on the traveling route, the position of a forward vehicle traveling in front of the self-vehicle cannot be set in advance. Therefore, when the position of a forward vehicle traveling in front of the self-vehicle is determined, the speed of the other vehicle traveling in front of the self-vehicle is set as a recommended speed of the self-vehicle at the position.

(2-7) Selection and Determination of a Recommended Speed at Each Point

The each point recommended speed selection determining unit 17 selects a recommended speed at each point from among the recommended speeds at each point (in each road section) on the traveling route acquired by the speed limit recording unit 11 and the recommended speed arithmetic units 12 to 16. FIG. 13 is a diagram for explaining recommended speeds at plural points which are made to change according to changes in the road state, and shows a case in which no speed limit is set for the traveling route, and only the road-width-based recommended speed arithmetic unit 12, the road-geometry-based recommended speed arithmetic unit 13, and the traffic-light-information-based recommended speed arithmetic unit 15 determine recommended speeds. For example, when a plurality of recommended speeds at the same point (in the same road section) on the traveling route are computed, the each point recommended speed selection determining unit 17 selects the lowest one of them in consideration of safe travel. More specifically, because only the recommended speed determined in the arithmetic operation based on the road width is provided for the road section leading to the start point of a curve on the traveling route shown in the example of FIG. 13, the each point recommended speed selection determining unit selects the speed as the recommended speed in the road section.

Further, because the recommended speed determined in the arithmetic operation based on the road width and the recommended speed determined in the arithmetic operation based on the road geometry are provided for the road section extending from the start point of the curve on the traveling route to the end point of the curve, the each point recommended speed selection determining unit 17 selects the speed determined in the arithmetic operation based on the road geometry which is the lowest one of them as the recommended speed in the road section. In addition, because the recommended speed determined in the arithmetic operation based on the road width, the recommended speed determined in the arithmetic operation based on the road geometry, and the recommended speed determined in the arithmetic operation based on the traffic light information are provided for the road section leading to a signalized intersection on the traveling route, the each point recommended speed selection determining unit 17 selects the speed determined in the arithmetic operation based on the traffic light information which is the lowest one of them as the recommended speed in the road section.

(3) Process of Computing a Recommended Speed which is Carried Out by the Second Recommended Speed Arithmetic Unit The second recommended speed arithmetic unit 20 computes a transition between recommended speeds which connects between different recommended speeds which are respectively acquired for different points (different road sections) on the traveling route in the above-mentioned way in such a way that the recommended speed continuously varies between the points (between the road sections). FIG. 14 is a diagram explaining a process of computing a speed which connects between the recommended speeds set for any two adjacent points, which is carried out by the second recommended speed arithmetic unit, and shows a case of computing a transition between the recommended speeds in such a way that the recommended speeds set for any two adjacent points as shown in FIG. 13 continuously vary therebetween. FIG. 15 is the diagram showing an example of the parameters set by the parameter setting unit 22. When receiving the recommended speed at each point from the first recommended speed arithmetic unit 10, the recommended-speed-variation-between-points arithmetic unit 21 computes a transition between the recommended speeds for any two adjacent points in such a way that the recommended speed, which is acquired for each point by the first recommended speed arithmetic unit 10, smoothly varies from one set for each point to one set for the next point according to the speed variation function determined using a parameter set by the parameter setting unit 22.

In the example shown in FIG. 14, a solid curved line shows a transition between the recommended speeds in a road section in which the self-vehicle will stop at a red light after going around a curve on the traveling route, the transition between the recommended speeds being computed according to the speed variation function for deceleration which is determined using the parameter about gasoline-powered vehicles. Further, a dash-dotted curved line shows a transition between the recommended speeds which is computed according to the speed variation function for deceleration which is determined using the parameter about electric vehicles. In a case in which the self-vehicle is a gasoline-powered one, for example, there is a risk of producing engine stalling when the driver steps on the brake and there is a case of strongly causing unsmooth movements when the driver steps on the brake while selecting a lower gear, it is preferable for the driver to slow down the self-vehicle by using the engine brake while the vehicle speed falls within a relatively high speed range and to slow down the self-vehicle by using the foot brake while the vehicle speed falls within a relatively low speed range. Therefore, the recommended-speed-variation-between-points arithmetic unit 21 reads the parameter about gasoline-powered vehicles from among the parameters set by the parameter setting unit 22 as shown in FIG. 15 to determine the speed variation function by using the parameter. For example, in the example shown in FIG. 14, when the vehicle speed is equal to or higher than 30 km/h, the recommended-speed-variation-between-points arithmetic unit computes a speed according to the speed variation function of decreasing the speed according to the deceleration ratio of the engine brake defined by the parameter read from the parameter setting unit 22, and outputs the speed acquired thereby as the recommended speed. In contrast, when the vehicle speed is lower than 30 km/h, the recommended-speed-variation-between-points arithmetic unit computes a speed according to the speed variation function of decreasing the speed according to the deceleration ratio of the foot brake defined by the parameter read from the parameter setting unit 22, and defines the speed acquired thereby as the recommended speed. In this way, the recommended speed presentation device causes the self-vehicle to slow down smoothly to the target low speed of 10 km/h for red lights.

In contrast, in a case in which the self-vehicle is an electric one, because the power generation (regeneration) caused by the motor is precisely controllable, it is preferable to reduce the recommended speed within as a wide speed range as possible in such a way that the self-vehicle can recover the regenerative power efficiently. Therefore, the recommended-speed-variation-between-points arithmetic unit 21 reads the parameter about electric vehicles from among the parameters set by the parameter setting unit 22 as shown in FIG. 15, and computes a transition between the recommended speeds set for any two adjacent points (any two adjacent road sections) according to the speed variation function determined using the parameter. Because the current value which is absorbed into the vehicle battery has a restriction, the recommended-speed-variation-between-points arithmetic unit computes a transition between the recommended speeds set for any two adjacent points with deceleration for making the regenerative current not exceed a fixed value by using the speed variation function of reducing the speed in such a way that the amount of regenerative power generation is fixed, as shown by the dash-dotted line in FIG. 14.

Further, a speed change by the acceleration or deceleration in a transition between the recommended speeds set for any two adjacent points is greatly affected by the road slope of the traveling route along which the self-vehicle is traveling. Therefore, the slope information is recorded in the map data recording unit 3 in advance, and is used for the arithmetic operation of computing a transition between the recommended speeds according to the speed variation function. Concretely, when the self-vehicle is traveling on an uphill road, the recommended-speed-variation-between-points arithmetic unit sets the speed change for acceleration to a slow one to prevent acceleration on the uphill which worsens the fuel efficiency. In contrast, when the self-vehicle is traveling on a downhill road, the recommended-speed-variation-between-points arithmetic unit sets the speed change for acceleration according to the road slope to cause the self-vehicle not to use the driving force of the engine or the motor as much as possible, thereby making the fuel cut or the regeneration brake work effectively. For example, when the slope of the downhill is large, and the self-vehicle is being accelerated without using the driving force (the gear is neutral), the recommended-speed-variation-between-points arithmetic unit sets the acceleration as the speed change. As an alternative, when the slope of the downhill is small, and the self-vehicle is not being accelerated sufficiently unless using the driving force, the recommended-speed-variation-between-points arithmetic unit sets acceleration falling within a range which enables the self-vehicle to accelerate with an engine rotation having little fuel consumption (e.g., 1,500 rpm) as the speed change.

Next, the traveling speed correcting unit 23 corrects the recommended speed to be presented to the driver at the current time to a recommended speed at a point where the self-vehicle is expected to pass through after a lapse of several seconds to over ten seconds from the current time by using the speed variation function used for the arithmetic operation of computing a recommended speed which is carried out by the recommended-speed-variation-between-points arithmetic unit 21. Explaining with reference to FIG. 14, the speed which is to be displayed as the recommended speed at a time t immediately after the self-vehicle passes through the curve is the recommended speed at a point where the self-vehicle will travel after a lapse of 5 seconds from the current time, for example. In the case in which the self-vehicle is an electric one, the speed shown by a circle symbol in FIG. 14 at a point where deceleration is started is corrected in such a way as to be the recommended speed at the time t.

The driver's reaction time, the reaction time of the vehicle (in general, because a large-size vehicle cannot change its speed suddenly, the recommended speed is notified to the driver in good time), etc. are set to the traveling speed correcting unit 23 as parameters, and the traveling speed correcting unit 23 determines if the speed which the vehicle should have after a lapse of how long from the current time is defined as the recommended speed to be presented to the driver at the current time on the basis of the values of these parameters. Further, there is a case in which a recommended speed is determined by the forward-vehicle-information-based recommended speed arithmetic unit 15 when there occurs an event that needs the driver's prompt reaction, such as a merge with other traffic, another vehicle cutting into the line in front of the self-vehicle, or a stop of a forward vehicle traveling in front of the self-vehicle. In this case, the recommended speed presentation device needs to promptly present the recommended speed to the driver as the final recommended speed, and inputs the recommended speed directly to the traveling speed correcting unit 23. When receiving the recommended speed determined by the forward-vehicle-information-based recommended speed arithmetic unit 15, the traveling speed correcting unit 23 promptly outputs the recommended speed to the recommended speed presenting unit 8. As a result, deceleration of a forward vehicle traveling in front of the self-vehicle, or the like can be promptly reflected in the recommended speed.

(4) Process of Presenting the Recommended Speed

The recommended speed presenting unit 8 presents the recommended speed outputted thereto from the second recommended speed arithmetic unit 20 to the driver by using the display device 8a or the sound output unit 8b. In accordance with the present invention, through the above-mentioned processes (1) to (3), the recommended speed in each of the road sections on the traveling route along which the self-vehicle is scheduled to travel, the transition between the recommended speeds set for any two adjacent ones of these road sections, and the road state information corresponding to each of the road sections for which the recommended speed is computed (e.g., the road width, the road geometry, the traffic light change times, the presence or absence of a forward vehicle traveling in front of the self-vehicle, etc.) are acquired. Therefore, when presenting the recommended speed to the driver, the recommended speed presentation device presents the recommended speed in each road section, the transition between the recommended speeds set for any two adjacent road sections, the road state information corresponding to the road section that causes the computation of the recommended speed, and the command for accelerating or decelerating the self-vehicle according to the recommended speed are presented to the driver, so that the driver can drive the self-vehicle while recognizing the road state information that causes the determination of the recommended speed, and also recognizing the recommended speed as a guide. Hereinafter, a case in which the recommended speed presenting unit 8 displays the recommended speed and the transition from this recommended speed to the next recommended speed, the road state information that causes the computation of the recommended speed, and the command of accelerating or decelerating the self-vehicle according to the recommended speed on a speedometer displayed on the display device 8a disposed on the instrument panel of the self-vehicle will be explained.

Figure 17:
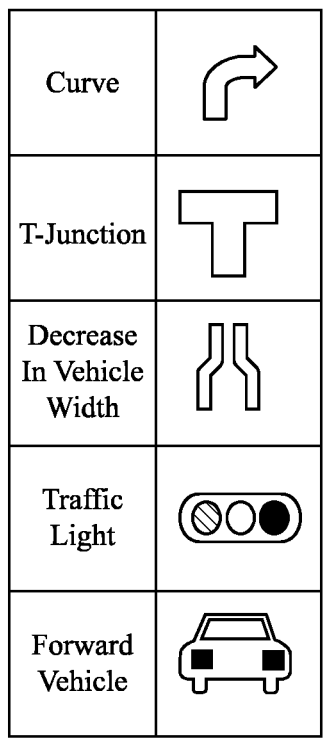
FIG. 17 is a diagram showing an example of icon images each expressing road state information which causes the computation of a recommended speed.

FIGS. 16 and 17 are diagrams showing a first display example of the recommended speed and the operation command, FIG. 16 shows a display example of the speedometer, and FIG. 17 shows an example of icon images each expressing road state information that can cause the computation of a recommended speed. In the example shown in FIG. 16, the recommended speed presenting unit includes the recommended speed in a road section far back from the start point of the curve on the traveling route shown in FIG. 14 (i.e., a road section from which the self-vehicle has to travel for a predetermined time or greater until reaching the start point of the curve) and the operation command in the speedometer 30 to display them. Referring to FIG. 16, the speedometer 30 is of analog type and a graphic showing the speedometer is displayed on the screen of the display device 8a. As a display unit for displaying information peculiar to the present invention, a recommended speed display part 31, an icon display part 32, and an acceleration or deceleration command part 33 are disposed.

The recommended speed display part 31 displays a recommended speed range by using a strip part (a part in FIG. 16 to which hatch lines are added) which is arranged in a peripheral portion of the speedometer 30, i.e., apart of a scale, as shown in FIG. 16, in such a way as to be aligned with the peripheral portion of the speedometer 30 according to the recommended speed. In the example shown in FIG. 16, a speed range showing how the current vehicle speed of the self-vehicle is deviated from the recommended speed range when the current vehicle speed goes out of the recommended speed range is also displayed by using another strip part aligned with the peripheral portion of the speedometer 30 (a part in FIG. 16 to which hatch lines different from those added to the recommended speed display part 31 are added). In this example, the recommended speed range ranges from 40 km/h to 60 km/h, and the current vehicle speed exceeds this recommended speed range by about 5 km/h.

The present invention is not aimed at making the driver to strictly drive the self-vehicle according to the recommended speed, and attaches importance to letting the driver drive the self-vehicle with safety while recognizing the recommended speed as a guide. It is therefore desirable to display a speed range including the recommended speed. To this end, as shown in FIG. 16, the recommended speed presenting unit 8 displays the recommended speed display part 31 which is the image of the strip part showing the recommended speed range in a part of the scale of the speedometer 30, thereby enabling the driver to easily make a comparison between the current vehicle speed and the recommended speed. The range of recommended speeds and a method for displaying the recommended speed range are determined in consideration of the design and the results of a questionnaire survey concerning visibility of many drivers, etc. For example, there can be various displaying methods including a method of displaying a strip having a predetermined speed range (e.g., ±10 km/h) centered at the recommended speed as the speed range, and a method of displaying a gradational expression in which the recommended speed is highlighted at the center thereof and the brightness of each of both sides gradually decreases with distance from the center.

The icon display part 32 is placed in a part of the speedometer 30, and an icon image showing the road state information which causes the computation of the recommended speed is displayed on the icon display part by the recommended speed presenting unit 8. The driver can know that the recommended speed is computed on the basis of what type of road state information by referring to the icon image displayed on the icon display part 32. Therefore, it is desirable to prepare icon images according to possible causes of a change in the recommended speed. Examples of icon images showing road geometries, such as a curve and a T-junction, an icon image showing a change in the road width, an icon image showing that the traffic light has turned red, and an icon image showing the existence of a forward vehicle traveling in front of the self-vehicle are shown in FIG. 17. A display as shown in FIG. 17 is produced according to a request from the driver. Further, because when the speedometer shown in FIG. 16 is displayed, the self-vehicle is traveling in the road section located before the start point of the curve on the traveling route shown in FIG. 14, i.e., the straight portion on the traveling route, nothing is displayed on the icon display part 32 shown in FIG. 16.

The acceleration or deceleration command part 33 displays an image of an arrow oriented upward or downward to command the driver to accelerate or decelerate the self-vehicle to a speed. The recommended speed presenting unit 8 receives the recommended speed in each road section on the traveling route, the transition between the recommended speeds set for two adjacent road sections, and the road state information that causes the computation of the recommended speed from the second recommended speed arithmetic unit 20, and displays the arrow image for commanding the driver to perform acceleration or deceleration for causing the current speed to match the recommended speed at a position ahead of the current position on the acceleration or deceleration command part 33. In the example shown in FIG. 16, the current vehicle speed exceeds 60 km/h which is the upper limit of the recommended speed range by about 5 km/h, and a downward arrow image is displayed to urge the driver to slow down the self-vehicle. At this time, the recommended speed presenting unit can display an icon for warning showing that the current vehicle speed exceeds the recommended speed (e.g., across image) on the icon display part 32.

Figure 18:
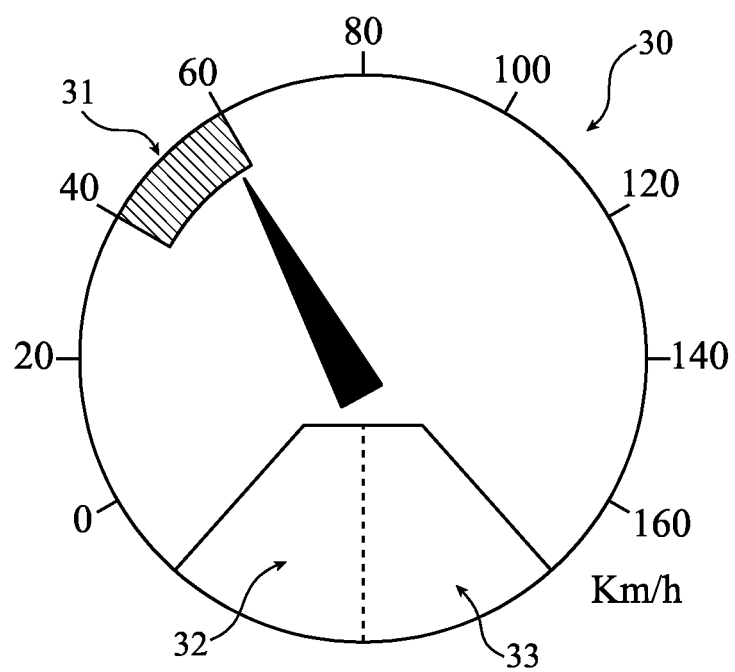
FIG. 18 is a diagram showing a second display example of the recommended speeds and the operation command.

FIG. 18 is a diagram showing a second display example of the recommended speed and the operation command, and FIG. 18 shows a display example of the speedometer. Also in the example shown in FIG. 18, the recommended speed presenting unit includes the recommended speed in a road section far back from the start point of the curve on the traveling route shown in FIG. 14 (i.e., a road section from which the self-vehicle has to travel for a predetermined time or greater until reaching the start point of the curve) and the operation command in the speedometer 30 to display them, like in the example shown in FIG. 16. FIG. 18 shows a case in which the driver slows down the self-vehicle according to the deceleration command displayed in the acceleration or deceleration command part 33 shown in FIG. 16 in such a way that the vehicle speed falls within the recommended speed range displayed in the recommended speed display part 31. In this case, when the vehicle speed of the self-vehicle falls within the recommended speed range, the deceleration command displayed in the acceleration or deceleration command part 33 disappears, and the driver can recognize that he or she is driving the self-vehicle according to the recommended speed.

Figure 19:
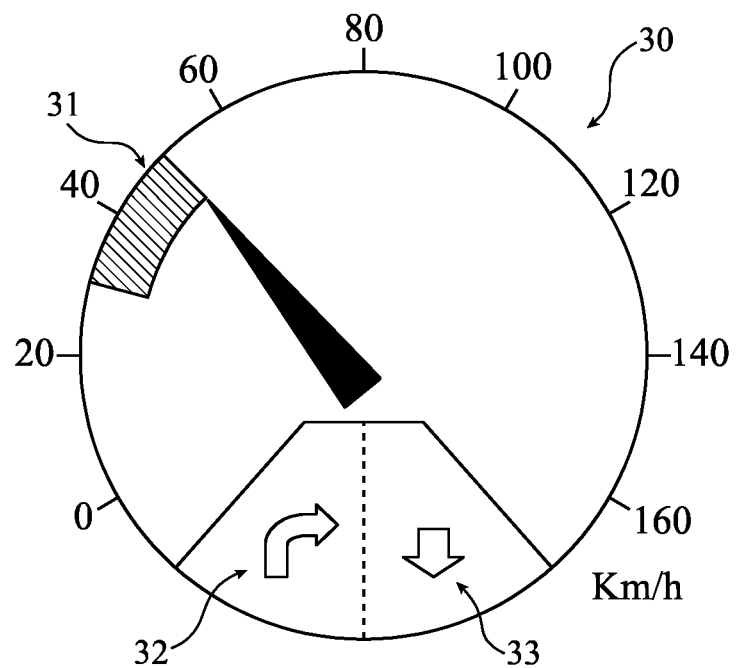
FIG. 19 is a diagram showing a third display example of the recommended speeds and the operation command.

FIG. 19 is a diagram showing a third display example of the recommended speed and the operation command, and FIG. 19 shows a display example of the speedometer. In the example shown in FIG. 19, the recommended speed presenting unit includes the recommended speed in a road section immediately before the start point of the curve on the traveling route shown in FIG. 14 (i.e., a road section from which the self-vehicle will reach the start point of the curve in less than a predetermined time) and the operation command in the speedometer 30 to display them. As shown in FIG. 19, when the self-vehicle reaches the road section immediately before the start point of the curve, the recommended speed presenting unit 8 display a strip part showing the recommended speed range for curve traveling from 30 km/h to 50 km/h on the recommended speed display part 31 in order to call attention to the curve. The recommended speed presenting unit 8 also displays an icon image showing the "curve" which is the road state information corresponding to the road section for which the recommended speed range displayed on the recommended speed display part 31 is computed on the icon display part 32. Because the current vehicle speed is the upper limit of the recommended speed range displayed on the recommended speed display part 31, the recommended speed presenting unit 8 further displays a downward arrow image for commanding the driver to decelerate the self-vehicle in such a way that the current vehicle speed falls within the recommended speed range on the acceleration or deceleration command part 33. The icon image showing the "curve" is displayed in such a way that the driver can identify whether the curve is a right or left one according to the state of the road.

The recommended speed presenting unit 8 further displays an arrow image for commanding the driver to decelerate the self-vehicle in such a way that the vehicle speed matches the transition between recommended speeds from the recommended speed range set for the road section including the straight portion on the traveling route shown in FIG. 18 to the recommended speed range set for the road section including the curve shown in FIG. 19 on the acceleration or deceleration command part 33. The driver can recognize that the recommended speed range currently being displayed on the recommended speed display part 31 is the recommended speed in the curve from the icon currently being displayed on the icon display part 32, and simply should drive the self-vehicle according to the command currently being displayed on the acceleration or deceleration command part 33 in order to drive the self-vehicle according to the recommended speed.

Figure 20:
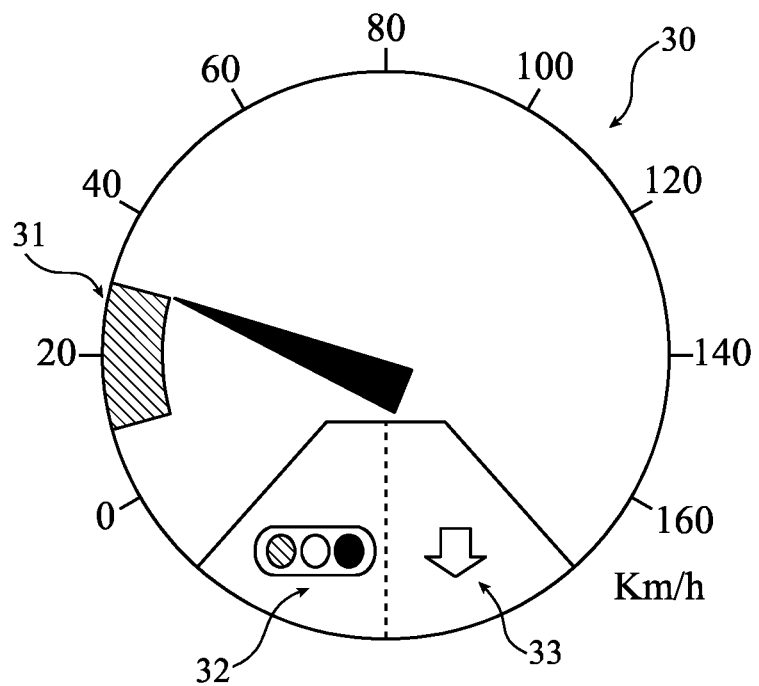
FIG. 20 is a diagram showing a fourth display example of the recommended speeds and the operation command.

FIG. 20 is a diagram showing a fourth display example of the recommended speed and the operation command, and FIG. 20 shows a display example of the speedometer. In the example shown in FIG. 20, the recommended speed presenting unit includes the recommended speed in a road section extending from a point on the traveling route of FIG. 14 where the recommended speed presentation device receives traffic light information to the entrance of a signalized intersection and the operation command in the speedometer 30 to display them. As shown in FIG. 20, after receiving the traffic light information, the recommended speed presenting unit 8 displays a strip part showing a recommended speed range from 10 km/h to 30 km/h which is set for the time of passing through the signalized intersection in the road section extending up to the entrance of the signalized intersection on the recommended speed display part 31. The recommended speed presenting unit 8 also displays an icon image showing the "traffic light" which causes the computation of the recommended speed range displayed on the recommended speed display part 31 on the icon display part 32. Because the current vehicle speed is the upper limit of the recommended speed range displayed on the recommended speed display part 31, the recommended speed presenting unit 8 further displays a downward arrow image for commanding the driver to decelerate the self-vehicle in such a way that the current vehicle speed falls within the recommended speed range on the acceleration or deceleration command part 33.

The recommended speed presenting unit 8 further displays an arrow image for commanding the driver to decelerate the self-vehicle in such a way that the vehicle speed matches the transition between recommended speeds from the recommended speed range set for the road section including the curve on the traveling route shown in FIG. 19 to the recommended speed range set for the road section including the signalized intersection shown in FIG. 20 on the acceleration or deceleration command part 33. The driver can recognize that the recommended speed range currently being displayed on the recommended speed display part 31 is the recommended speed for enabling the self-vehicle to pass through the signalized intersection without stopping at this intersection from the icon currently being displayed on the icon display part 32, and simply should drive the self-vehicle according to the command currently being displayed on the acceleration or deceleration command part 33 in order to drive the self-vehicle according to the recommended speed.

Thus, the recommended speed presenting unit 8 provides an HMI (Human Machine Interface) in which the recommended speed at each point (each road section), the transition between recommended speeds, the road state information which causes the computation of the recommended speed, and the acceleration or deceleration command for commanding the driver to accelerate or decelerate the self-vehicle in such a way that the vehicle speed matches the recommended speed, thereby enabling the driver to easily drive the self-vehicle while recognizing the recommended speed as a guide.

Although the case in which the recommended speed presenting unit 8 displays the recommended speed or the like on the screen of the display device 8*a* disposed in the instrument panel is shown in the above-mentioned explanation, the recommended speed or the like can be displayed on a display unit of a car navigation device disposed separately from the recommended speed presentation device in accordance with the present invention. Further, only the icon display part 32 can be displayed in such a way that the driver can easily recognize the state of the target place visually. For example, only the icon display part 32 can be superimposed on the route in the map displayed on the car navigation device.

Further, although the case in which the recommended speed presenting unit 8 produces an image display of the recommended speed or the like on the screen of the display device 8a to present the recommended speed or the like to the driver is shown, the recommended speed presenting unit can provide voice guidance of the recommended speed or the like for the driver by using the sound output unit 8b.

As mentioned above, the recommended speed presentation device in accordance with this Embodiment 1 includes the traveling route estimating unit 1 for estimating a route along which a moving object will travel and which falls within a predetermined region from the current position of the moving object, the first recommended speed arithmetic unit 10 for computing a recommended speed in each road section on the route estimated by the traveling route estimating unit 1 on the basis of road state information showing a road state, and the second recommended speed arithmetic unit 20 for computing a recommended speed in a road section between road sections for each of which the recommended speed is computed by the first recommended speed arithmetic unit 10 according to a predetermined speed variation function. Because the recommended speed presentation device is constructed in this way, the recommended speed presentation device can determine a recommended speed adapted for one of various road states in the traveling route. Further, the recommended speed presentation device in accordance with this Embodiment 1 includes the recommended speed presenting unit 8 for presenting the recommended speed in each road section computed by the first recommended speed arithmetic unit 10 and the recommended speed in each road section computed by the second recommended speed arithmetic unit 20 to the driver. This recommended speed presenting unit 8 presents the descriptions of the road state information corresponding to each road section for which the recommended speed is computed to the driver. The recommended speed presenting unit 8 also displays at least one of images respectively showing the descriptions of the road state information corresponding to each road section, and an acceleration or deceleration command for causing the driver to make the speed of the self-vehicle match the recommended speed, as well as the recommended speed in each road section, to present at least the one of them to the driver. The recommended speed presenting unit 8 presents a recommended speed on the route which the vehicle will have after a lapse of a predetermined time as a recommended speed at the current time. Because the recommended speed presenting unit operates in this way, the recommended speed presentation device can present the recommended speed at which the self-vehicle can travel with safety and with a small amount of energy consumption according to various road states in the traveling route. Therefore, the recommended speed presentation device enables the driver to drive the self-vehicle with safety and with a small amount of energy consumption as long as the driver drives the self-vehicle according to this recommended speed.

Embodiment 2

A recommended speed presentation device in accordance with Embodiment 2 uses a recommended speed acquired in accordance with above-mentioned Embodiment 1 as a speed limiter. In a speed limiter, the upper limit of the traveling speed is limited to 90 km/h in Japan for the purpose of improvements in the safety of heavy-duty trucks and a reduction of the load on the environment. However, when a vehicle is traveling on a road having many curves and a relatively low speed limit like a highway in an urban area, it is necessary to further reduce the speed at which to activate a speed limiter to a lower one; otherwise the accident prevention effect is not sufficient. To this end, the recommended speed presentation device in accordance with this Embodiment 2 makes the upper limit speed of the speed limiter variable by using the recommended speed according to the road state of the traveling route which is acquired in accordance with above-mentioned Embodiment 1, thereby being able to impose a limit on the traveling speed according to the road state, and provide an improvement in the safety. While the recommended speed presentation device in accordance with this Embodiment 2 has the same basic structure as that shown in FIG. 1 in accordance with above-mentioned Embodiment 1, the recommended speed presentation device in accordance with this Embodiment 2 differs from that in accordance with above-mentioned Embodiment 1 in that a recommended speed presenting unit 8 also functions as the speed limiter. Therefore, the components of the recommended speed presentation device will be explained with reference to FIG. 1.

Figure 21:
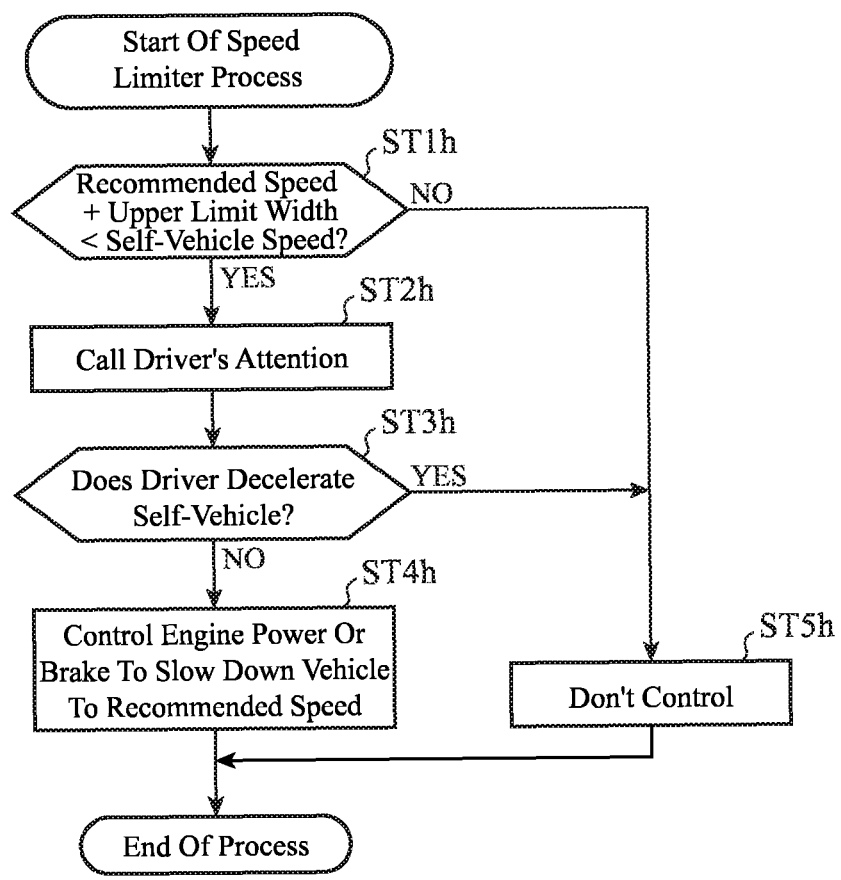
FIG. 21 is a flow chart showing a flow of a process of using a recommended speed acquired by a recommended speed presentation device in accordance with Embodiment 2 of the present invention as a speed limiter.

Next, the operation of the recommended speed presentation device will be explained. FIG. 21 is a flow chart showing a flow of a process of using a recommended speed acquired by the recommended speed presentation device in accordance with Embodiment 2 of the present invention as the speed limiter. First, the recommended speed presenting unit 8 determines whether the traveling speed of a self-vehicle exceeds a value which the recommended speed presenting unit acquires by adding a predetermined value (e.g., 20 km/h) to a recommended speed inputted thereto from a second recommended speed arithmetic unit 20 (step ST1h). When the traveling speed of the self-vehicle is equal to or lower than the value which the recommended speed presenting unit acquires by adding the predetermined value to the recommended speed (NO in step ST1h), the recommended speed presenting unit advances to step ST5h. In contrast, when the traveling speed of the self-vehicle is higher than the value which the recommended speed presenting unit acquires by adding the predetermined value to the recommended speed (YES in step ST1h), the recommended speed presenting unit 8 calls the driver's attention to an excess in the recommended speed of the self-vehicle (step ST2h). Like in the case of above-mentioned Embodiment 1, the driver's attention to an excess in the recommended speed is called by displaying a warning image on a speedometer 30 using a display device 8a, or by outputting a voice or a warning sound using a sound output unit 8b.

The recommended speed presenting unit 8 measures a time which has elapsed after starting calling the driver's attention to an excess in the recommended speed in step ST2h, and determines whether the driver has started decelerating the self-vehicle after a lapse of a fixed reaction time (e.g., about 3 seconds) since the driver's attention was called (step ST3h). When the driver has started decelerating the self-vehicle (YES in step ST3h), the recommended speed presenting unit advances to step ST5h. In contrast, when the driver has not started decelerating the self-vehicle yet (NO in step ST3h), the recommended speed presenting unit 8 makes a request of the vehicle control device of the self-vehicle to slow down the self-vehicle to a speed close to the recommended speed. When receiving the above-mentioned request from the recommended speed presenting unit 8, the vehicle control device controls the engine power, the brake, or both of them to slow down the self-vehicle to a speed close to the recommended speed (step ST4h).

When the traveling speed of the self-vehicle is equal to or lower than the value which the recommended speed presenting unit 8 acquires by adding the predetermined value to the recommended speed, or when the driver has started decelerating the self-vehicle in response to calling the driver's attention, the recommended speed presenting unit 8 does not make the above-mentioned request of the vehicle control device because the recommended speed presenting unit does not have to reduce the vehicle speed or has already reduced the vehicle speed. As a result, the vehicle control device does not carry out any control operation of reducing the speed of the self-vehicle (step ST5*h*).

The vehicle to which Embodiment 2 is applied can be not only a large-size vehicle, but a passenger car, a two-wheeled vehicle, or the like, and the size of the vehicle is not limited.

As mentioned above, because the recommended speed presentation device in accordance with Embodiment 2 uses the recommended speed acquired in accordance with above-mentioned Embodiment 1 as the speed limiter, the recommended speed presentation device can impose a limit on the traveling speed according to the road state and provide an improvement in the safety.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the recommended speed presentation device in accordance with the present invention can seamlessly present a recommended speed adapted for one of various road states according to a transition in the road state, the recommended speed presentation device in accordance with the present invention is suitable for use in, for example, an electric vehicle or the like that needs to take into consideration the power consumption according to the road state.

EXPANATIONS OF REFERENCE NUMERALS

1 traveling route estimating unit, 2 position measuring unit, 3 map data recording unit, 4 travel history recording unit, 5 communication unit for communicating with an infrastructure or the like, 6 vehicle detecting unit, 7 vehicle information acquiring unit, 8 recommended speed presenting unit, 8*a* display device, 8*b* sound output unit, 10 first recommended speed arithmetic unit, 11 speed limit recording unit, 12 road-width-based recommended speed arithmetic unit, 13 road-geometry-based recommended speed arithmetic unit, 14 travel-history-based recommended speed arithmetic unit, 15 traffic-light-information-based recommended speed arithmetic unit, 16 forward-vehicle-information-based recommended speed arithmetic unit, 17 each point recommended speed selection determining unit, 20 second recommended speed arithmetic unit, recommended-speed-variation-between-points arithmetic unit, 22 parameter setting unit, 23 traveling speed correcting unit, 30 speedometer, 31 recommended speed display part, 32 icon display part, 33 deceleration or acceleration command part.

The invention claimed is:

1. A navigation device having a function of computing a recommended speed of a moving object, said navigation device comprising:

a traveling route estimating unit for estimating a route along which said moving object will travel and which falls within a predetermined region from a current position;

a first recommended speed arithmetic unit for computing a recommended speed in each of road sections on the route estimated by said traveling route estimating unit on a basis of road state information showing a road state;

a second recommended speed arithmetic unit for computing a recommended speed in a road section between said road sections for each of which the recommended speed is computed by said first recommended speed arithmetic unit according to a predetermined speed variation function; and a parameter setting unit for storing parameters defining operational characteristics of said moving object according to types of moving objects including said moving object, wherein said second recommended speed arithmetic unit determines the speed variation function for defining acceleration and deceleration according to the operational characteristics of said moving object by using a parameter which said second recommended speed arithmetic unit selects on a basis of the type of said moving object from among the parameters stored in said parameter setting unit, and computes the recommended speed in the road section between said road sections for which the recommended speed is computed by said first recommended speed arithmetic unit according to said speed variation function.

2. The navigation device according to claim 1, wherein said navigation device includes a recommended speed presenting unit for presenting the recommended speed in each of said road sections which is computed by said first recommended speed arithmetic unit and the recommended speed in said road section which is computed by said second recommended speed arithmetic unit to a driver.

3. The navigation device according to claim 1, wherein by using at least two methods each of using road state information in the road section on the route estimated by said traveling route estimating unit, said road state information being one of a road speed limit, a road width, a road geometry, a travel history, traffic light information showing traffic light change times, and information about other moving objects traveling in front of said moving object along said root, said first recommended speed arithmetic unit computes the recommended speed in the road section corresponding to said road state information.

4. The navigation device according to claim 1, wherein said parameter setting unit has maximum deceleration at a time of applying a regeneration brake as a parameter of a vehicle driven by a motor.

5. The navigation device according to claim 1, wherein said parameter setting unit has a lower limit speed at a time of applying an engine brake as a parameter of a gasoline engine vehicle.

6. The navigation device according to claim 1, wherein said recommended speed presenting unit presents descriptions of said road state information corresponding to said road section for which the recommended speed is computed to a driver.

7. The navigation device according to claim 1, wherein said recommended speed presenting unit displays at least one of images respectively showing descriptions of said road state information corresponding to said road section, and an acceleration or deceleration command for making a speed of said moving object match the recommended speed, as well as the recommended speed in said road section, to present at least said image to a driver.

8. The navigation device according to claim 1, wherein said recommended speed presenting unit presents a recommended speed on said route which said moving object will have after a lapse of a predetermined time as a recommended speed at a current time.

9. The navigation device according to claim 1, wherein said navigation device includes a speed limiter unit for, when said moving object has a speed exceeding said recommended speed by a predetermined value, notifying a travel control device of said moving object that said moving object has an excessive speed.

10. The navigation device according to claim 1, wherein when a destination is set to said navigation device and route guidance about a route is carried out, said traveling route estimating unit estimates said route as the route along which said moving object will travel.

11. The navigation device according to claim 10, wherein when no destination is set to said navigation device and no route guidance is carried out, said traveling route estimating unit estimates a most heavily trafficked road among roads existing in the predetermine region from the current position as the route along which said moving object will travel.

12. A recommended speed arithmetic device for computing a recommended speed of a moving object, said recommended speed arithmetic device comprising:
   a first recommended speed arithmetic unit for computing a recommended speed in each of road sections on a route along which said moving object will travel and which falls within a predetermined region from a current position on a basis of road state information showing a road state;
   a second recommended speed arithmetic unit for computing a recommended speed in a road section between said road sections for each of which the recommended speed is computed by said first recommended speed arithmetic unit according to a predetermined speed variation function; and
   a parameter setting unit for storing parameters defining operational characteristics of said moving object according to types of moving objects including said moving object,
   wherein said second recommended speed arithmetic unit determines the speed variation function for defining acceleration and deceleration according to the operational characteristics of said moving object by using a parameter which said second recommended speed arithmetic unit selects on a basis of the type of said moving object from among the parameters stored in said parameter setting unit, and computes the recommended speed in the road section between said road sections for which the recommended speed is computed by said first recommended speed arithmetic unit according to said speed variation function.

13. The recommended speed arithmetic device according to claim 11, wherein by using at least two methods each of using road state information in the road section on the route estimated by said traveling route estimating unit, said road state information being one of a road speed limit, a road width, a road geometry, a travel history, traffic light information showing traffic light change times, and information about other moving objects traveling in front of said moving object along said root, said first recommended speed arithmetic unit computes the recommended speed in the road section corresponding to said road state information.

14. The recommended speed arithmetic device according to claim 12, wherein said recommended speed arithmetic device outputs descriptions of said road state information corresponding to said road section for which the recommended speed is computed.

15. The recommended speed arithmetic device according to claim 12, wherein said recommended speed arithmetic device includes a traveling route estimating unit for estimating the route along which said moving object will travel and which falls within the predetermined region from the current position.

16. The recommended speed arithmetic device according to claim 12, wherein said recommended speed arithmetic device includes a speed limiter unit for, when said moving object has a speed exceeding said recommended speed by a predetermined value, notifying a travel control device of said moving object that said moving object has an excessive speed.

17. A recommended speed presentation device for presenting a recommended speed of a moving object to a driver, said recommended speed presentation device comprising:
   a traveling route estimating unit for estimating a route along which said moving object will travel and which falls within a predetermined region from a current position;
   a first recommended speed arithmetic unit for computing a recommended speed in each of road sections on the route estimated by said traveling route estimating unit on a basis of road state information showing a road state;
   a second recommended speed arithmetic unit for computing a recommended speed in a road section between said road sections for each of which the recommended speed is computed by said first recommended speed arithmetic unit according to a predetermined speed variation function;
   a recommended speed presenting unit for presenting the recommended speed in each of said road sections which is computed by said first recommended speed arithmetic unit and the recommended speed in said road section which is computed by said second recommended speed arithmetic unit to the driver; and
   a parameter setting unit for storing parameters defining operational characteristics of said moving object according to types of moving objects including said moving object,
   wherein said second recommended speed arithmetic unit determines the speed variation function for defining acceleration and deceleration according to the operational characteristics of said moving object by using a parameter which said second recommended speed arithmetic unit selects on a basis of the type of said moving object from among the parameters stored in said parameter setting unit, and computes the recommended speed in the road section between said road sections for which the recommended speed is computed by said first recommended speed arithmetic unit according to said speed variation function.

18. The recommended speed presentation device according to claim 17, wherein said recommended speed presenting unit presents descriptions of said road state information corresponding to said road section for which the recommended speed is computed to the driver.

* * * * *